US009679440B2

(12) United States Patent
Lyons

(10) Patent No.: US 9,679,440 B2
(45) Date of Patent: Jun. 13, 2017

(54) SYSTEMS AND METHODS FOR A COMMUNITY AWARD AND FOR PROVIDING CULTURALLY CONFIGURED AWARDS

(71) Applicant: Bally Gaming, Inc., Las Vegas, NV (US)

(72) Inventor: Martin S. Lyons, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 284 days.

(21) Appl. No.: 14/480,564

(22) Filed: Sep. 8, 2014

(65) Prior Publication Data

US 2015/0072748 A1 Mar. 12, 2015

Related U.S. Application Data

(60) Provisional application No. 61/875,505, filed on Sep. 9, 2013.

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.
CPC ................................ *G07F 17/3255* (2013.01)

(58) Field of Classification Search
USPC ............................ 463/16, 20, 22, 25, 39, 42
See application file for complete search history.

(56) References Cited

U.S. PATENT DOCUMENTS

2003/0153378 A1 8/2003 Schlegel et al.
2006/0033281 A1 * 2/2006 Wong .................. A63F 3/00157 273/292
2009/0209313 A1 * 8/2009 Chan ....................... G07F 17/32 463/20
2011/0105233 A1 5/2011 Aoki
2011/0218026 A1 9/2011 Grimm et al.
2013/0190079 A1 7/2013 Hawkins

* cited by examiner

*Primary Examiner* — Adetokunbo O Torimiro
(74) *Attorney, Agent, or Firm* — Seed IP Law Group LLP

(57) ABSTRACT

Systems and methods for providing culturally configured awards are disclosed. Awards to players are divided into sub-components expressed in culturally favorable number digits, such as “8.” A community award feature when triggered enables players to package awards as apparent gifts to other eligible players of the feature. A progressive award may also be provided.

8 Claims, 13 Drawing Sheets

SYSTEMS AND METHODS FOR A COMMUNITY AWARD AND FOR PROVIDING CULTURALLY CONFIGURED AWARDS

CROSS-REFERENCE TO RELATED APPLICATIONS

This application claims priority to, and the benefit of, Provisional Application No. 61/875,505, filed Sep. 9, 2013, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The disclosure relates generally to systems and methods directed toward providing awards in culturally configured number sets and, more specifically, to the creation and issuance of awards in amounts which are expressed in culturally favorable number digit sets.

BACKGROUND

Various types of gaming devices have been developed with features designed to captivate and maintain player interest. In general, a gaming device allows a player to play a base game of chance in exchange for a wager. In a pay-to-play (P2P) gaming environment the wager has value, such as wagering currency or credits representing currency. P2P gaming may occur in a physical venue, such as a casino, or on Internet and broadband communication networks where permitted. For novelty or "entertainment only" play the wagers are fictitious credits having no redemption value. Las Vegas style slot machines are an example of P2P gaming devices. Depending on the outcome of the base game, the player may be entitled to an award which is awarded to the player by the gaming machine, normally in the form of currency or game credits. Gaming devices may include flashing displays, lighted displays or sound effects to capture a player's interest in a gaming device.

Many modern gaming devices incorporate one or more secondary, feature or bonus games. These secondary games may be triggered by one or more outcomes from the base game such as, for example, a predefined symbol combination. These types of triggers are sometimes referred to as symbol driven triggers since they are determined by base game symbols. When the symbol combination occurs the gaming device processor enables the display for play of a secondary game. The secondary game may take the form of a number of free plays of the base game, a random selection game where the player selects from displayed offerings to reveal prizes, the play of a secondary game feature to win awards or the like.

In addition to symbol driven triggers there is also known to provide mystery prizes to players over and above any awards from the play of the base game or any base game symbol triggered feature. Often these mystery prizes are progressive prizes which may be arranged in triggered in a variety of manners. For example, in Olive, U.S. Pat. No. 7,108,603 issued Sep. 19, 2006 and titled "Slot Machine Game And System With Improved Jackpot Feature," the disclosure of which is incorporated by reference, there are disclosed networked gaming devices contributing, from the wagers for the play of the base games, to a progressive jackpot award. Based upon the value of the player's wager W at a gaming device to play a base game and the predetermined turnover for the jackpot, a virtual lottery is conducted (out of sight of the player) with each base game play where the odds of winning relate to the wager W and jackpot turnover amount. When the feature is randomly triggered play of a feature game is played to reveal the progressive award. Torango, U.S. Pat. No. 6,592,460 issued Jul. 15, 2003 and titled "Progressive Wagering System" discloses a similar type of "hidden lottery" type of mystery prize. In Acres et al. U.S. Reissued Pat. RE 38,812, reissued Oct. 4, 2005 and titled "Method And Apparatus For Operating Networked Gaming Devices," the disclosure of which is incorporated by reference, there is disclosed a system-based mystery jackpot which is triggered when the progressive pool reaches a selected (and unrevealed) amount randomly selected between pool minimum and maximum values.

Progressive jackpots can be symbol-based or mystery-based. For symbol-based progressives, gaming devices are linked on a network and portions of the wagers are allocated to a prize pool. When a player of a linked gaming device makes qualifying wagers (such as a required maximum wager) and obtains the jackpot symbol combination they are awarded the progressive jackpot. Acres et al U.S. Reissued Pat. RE 38,812 referenced above represents an example of a mystery progressive. Progressives such as described above are typically operated on either a local area network (LAN) for a bank or smaller group of gaming devices or a wide area network (WAN) encompassing numerous gaming devices perhaps several thousand for a large casino or even across multiple casino venues in multiple states. The advantage of broadening the progressive network is that the progressive pool can grow faster and to higher levels with greater participation and provide enticement to the players to play.

In networks including gaming devices it has been known to provide community games where players can participate in a community event. In Hornik, et al, U.S. Pub. 2012/0184351A1, filed Jan. 14, 2011 and titled "Systems, Methods, And Devices For Playing Wagering Games With Unlockable Community Game Features," players play a gaming device to unlock features for themselves and another player.

It has also been known for players to establish an account and to upload and download funds for gaming. Weiss, U.S. Pat. No. 6,896,616 issued May 24, 2005 and titled "Cashless Gaming System; Apparatus And Method, the disclosure of which is incorporated by reference, discloses the electronic transfer of funds in a gaming environment.

Awards from gaming devices in one respect are dictated by the gaming device static (fixed) pay table which provides a correspondence to a winning outcome and the award. Some awards, including progressive awards, are not static but vary. For example, a feature at a gaming device may provide a secondary game where one or more prizes are awarded and the prizes may fall within a range of award values. Thus awards may be expressed with various number digit sets, e.g. 454 credits, 275 credits.

In certain cultures numbers have cultural significance. For example, in some Western cultures the number "13" is considered unlucky and the number "7" is considered lucky.

In certain Asian cultures the number "8" is considered lucky and the number "4" is considered unlucky and associated with death.

It would be useful to, where available, adjust award amounts to avoid unlucky numbers and incorporate lucky numbers. When a player receives an award having the lucky numbers, e.g. "88" credits or "777" credits they will feel lucky (or at least not unlucky). Conversely and award of "44" credits may be deemed to be unlucky to a Chinese player.

SUMMARY

Described herein, in accordance with the disclosed embodiments, is a system and method for providing awards in culturally configured number sets. More specifically, some systems and methods are directed toward creation and issuance of awards in amounts which are expressed in culturally favorable number digit sets, such as awards ending in the number "8" and avoiding awards that end or include the number "4." In one embodiment, an award is triggered and is divided, according to an algorithm, into sub-component awards and the award amounts are adjusted to be expressed in culturally favorable amounts and avoid culturally unfavorable amounts. These amounts, in an embodiment, are awarded to a player at a gaming device through a game play mechanic such as picking icons which reveal the sub-component awards.

In another embodiment, the award may be broken into sub-component awards at least one of which is configured in its amounts to be expressed in culturally favorable number digits, such as "8" and "7," and to avoid culturally unfavorable numbers such as, for example, "4" and "13." In an embodiment the award may be from a secondary or feature game where one or more awards can be culturally configured or may be an award or promotion provided to the player by a system such as a mystery prize or awarded promotional credits.

In one embodiment, a chance-based gaming system for providing one or more culturally configured awards to players is disclosed. The system includes a plurality of chance-based gaming devices connected to a network to provide one or more culturally configured awards to players, each of the plurality of chance-based gaming devices including a processor. The system also includes one or more chance-based gaming servers connected to the network for communication with the plurality of chance-based gaming devices, each of the one or more chance-based gaming servers including a processor. One of the chance-based gaming servers and the chance-based gaming devices is configured to determine an award event, using a processor, of one or more of the culturally configured awards that issues to one or more players having a value A. At least one of the one or more chance-based gaming servers connected to the network for communication with the plurality of chance-based gaming devices includes a list of culturally favorable number sets and/or culturally unfavorable number sets. Continuing, one or more of the chance-based gaming servers and the chance-based gaming devices is configured to determine, using a processor, if a single award is to be issued, and (i) if value A is an amount expressed as a culturally favorable number set to provide for issuance of value A as the award, (ii) if value A is expressed in a culturally unfavorable number set to divide value A into at least two sub-component awards, and (iii) adjust the component awards to avoid the culturally unfavorable number sets for issuance of the awards. Additionally, one or more of the chance-based gaming servers and the chance-based gaming devices is configured to determine, using the processor, if multiple awards are to be issued, and (i) divide value A into at least two component awards, and (ii) adjust an amount of each component award to amounts expressed as culturally favorable number sets for issuance of the awards.

In one embodiment, a method is disclosed for providing a plurality culturally configured awards to players of chance-based gaming devices connected to a network for communication with a chance-based gaming server. The method includes: storing, on at least one of the chance-based gaming server and the chance-based gaming devices, a list of culturally favorable number sets and/or culturally unfavorable number sets; configuring one of the chance-based gaming server and the chance-based gaming devices to determine an award event that provides for issuance to one or more players of one or more of the culturally configured awards having a value A; enabling one of the chance-based gaming server and chance-based gaming devices to divide value A into a plurality of award sub-components; and enabling one of the chance-based gaming server and chance-based gaming devices to adjust the plurality of award sub-components to amounts expressed as culturally favorable number sets before issuing the culturally configured awards.

In a related embodiment a community feature is provided where, based upon an event at a gaming device or determined by a system event, an award is provided to the player that triggered the event and the player is afforded the opportunity to package and "gift" apparent awards to other eligible players on the network.

The triggering event triggers awards to one or more other players (recipient players) which are based upon the individual recipient player's wagering dynamics or other factors such as the player's loyalty club level or the like. The feature triggering player is presented with information related to other, eligible gaming devices on the community network. This information may be a graphical display providing a graphical representation related to the location of gaming devices eligible to receive the apparent gift. Eligibility may be based upon the players wagering dynamics such as amounts wagers over a period of time.

The triggering player in an embodiment may select one or more recipient players to provide an apparent gift to; however one or more or all other players will receive one or more awards. When a community award is "gifted" to one or more players, the gaming devices or the system may arrange the awards into sub-component awards to configure the same into culturally favorable award values. The player can package the apparent gift awards, designate the recipients, and send the awards to the recipient(s). As can be appreciated players in the community game will from time to time receive "gifts" from their fellow players who have invoked a triggering event.

In one embodiment, a chance-based gaming device-enabled method is disclosed for providing culturally configured awards to players. The method includes: providing a plurality of chance-based gaming devices connected to a network, each chance-based gaming device including a video display, a controller, and a memory; providing a chance-based gaming server connected to the network for communication with the plurality of chance-based gaming devices; configuring a controller and a data structure that stores data on the memory of a chance-based gaming device to define a triggering event that initiates a gift exchange session and an award pool; and configuring the controller and a data structure that stores data on the memory of a chance-based gaming device to: detect a triggering event at a triggering chance-based gaming device, determine eligibility criteria for the triggering chance-based gaming device and other eligible chance-based gaming devices, if any, on the network, and issue an award to the triggering chance-based gaming device based upon an occurrence of the trigger event, its eligibility criteria, and at least one other chance-based gaming device based upon the other chance-based gaming device's eligibility criteria.

In another aspect of one embodiment, the controller configured to: enable the video display at the triggering chance-based gaming device to display an interface showing other eligible chance-based gaming devices, and accept a selection from the triggering chance-based gaming device of at least one of the other eligible chance-based gaming devices to receive a gift and represent the award to the at least one other eligible chance-based gaming device as a gift from the triggering chance-based gaming device. In still another aspect of one embodiment, the controller is configured to enable the video display at the triggering gaming device to display a selection of graphical packaging the gift for the at least one other eligible gaming device. In yet another aspect of one embodiment, the controller is configured to enable the video display at the triggering chance-based gaming device to display a selection of gift envelopes for graphically packaging the gift for the at least one other eligible chance-based gaming device from the triggering chance-based gaming device.

In another aspect of one embodiment, the controller configured to issue the awards as one of a single award or multiple sub-awards and to express the awards in culturally favorable numbers. Still another aspect of one embodiment, further comprising configuring the controller and data structure that stores data on the memory to define a triggering event that initiates a gift exchange session and a progressive award pool. In yet another aspect of one embodiment, a progressive award may also be provided during the community feature of the game and may likewise be packaged into culturally favorable sub-component values Other features and numerous advantages of the various embodiments will become apparent from the following detailed description when viewed in conjunction with the corresponding drawings.

DETAILED DESCRIPTION

While the disclosed embodiments are primarily described with reference to a casino enterprise, it should be understood that the disclosed embodiments could be extended to other enterprises such as stores, service providers or other businesses which deal with repeat business customers and which desire to foster customer loyalty, entice the customer interaction and to expand their customer base.

Gaming Device Hardware, Software, Firmware and Peripherals:

By way of background and general understanding the components and functions of a typical gaming device will now be set forth. It should be understood that the following description should not be deemed as limited as to the scope and operation of the disclosed embodiments. For example, in one embodiment, a gaming device could be a chanced-based PC, tablet, laptop computer, or gaming capable cellular device such as a Smartphone.

Figure 1:
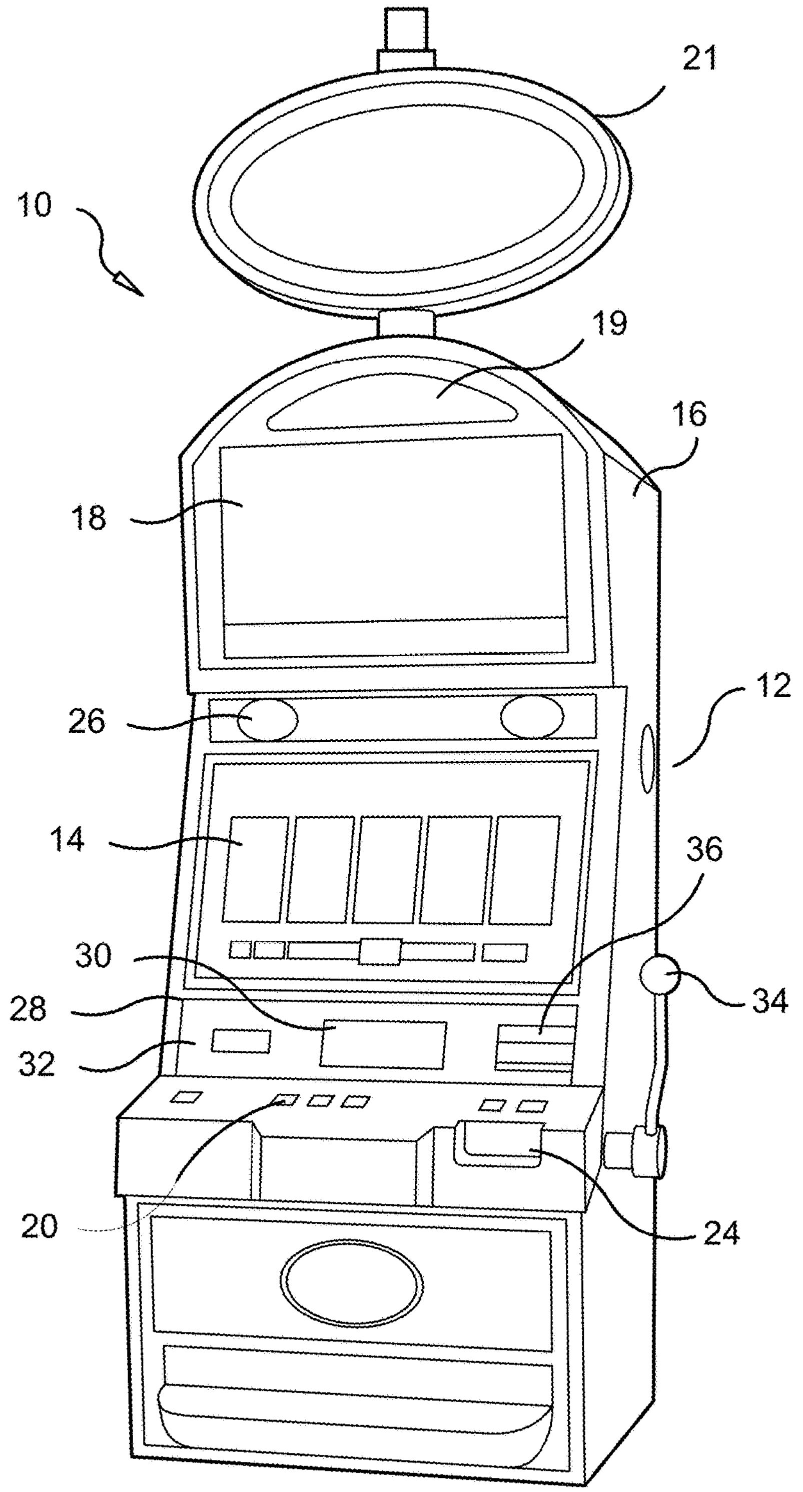
FIG. 1 illustrates a gaming terminal.

Referring now to the drawings, wherein like reference numbers denote like or corresponding elements throughout the drawings, and more particularly referring to FIG. 1, a gaming device 10 according to one or more embodiments is shown. The gaming device 10 is configured, as is well known, to accept a wager, provide for the play of a game and produce (usually randomly, pseudo-randomly) a winning or losing outcome. For a losing outcome the player receives no award. For a winning outcome the player receives an award usually an award measured in game credits. For certain jackpot awards a "hand pay" in cash by casino personnel may be required. The gaming device 10 includes a cabinet 12 providing an enclosure for the several components of the gaming device 10 and associated equipment.

A primary game display 14 is mounted to the cabinet 12. The primary game display 14 may be a video display such as an LCD, plasma, OLED or other electronic display or it may be an electro-mechanical display such as electro-mechanical stepper reels as are known in the art. The primary game display 14 may also be embodied as a combination of two or more electronic or mechanical displays disposed in an adjacent overlapping or overlying arrangement. The primary game display 14 may be mounted to one or more of a door for the cabinet 12 or the cabinet chassis itself. The primary game display 14 is located to display game content (and if desired other content) to the player. For example, the game content may be game outcomes presented by a plurality of video or electro-mechanical reels displaying symbols the combinations of which define winning or losing outcomes, video Poker, Keno or other form of base casino wagering game as is known in the art. Where the primary game display 14 is a video display, features such as bonus/feature games may also be presented. The foregoing description should not be deemed as limiting the content (graphics, video or text) which can be displayed at the primary game display 14. The cabinet 12 may comprise a slant-top, bar-top, or table-top style cabinet as is known in the art.

The gaming device 10 also includes in one or more embodiments a top box 16 which may support a printed back-lit glass (not shown) as is known in the art depicting the rules, award schedule, attract graphics or it may support a secondary game display 18 which may be of one of the types described above with reference to the primary game display 14. The top box 16 may also support a backlit glass with graphics defining a marquee 19 and a topper 21 including additional graphics.

To enable a player to provide input to the controller (e.g., processor) for the gaming device 10 a plurality of buttons 20 may be provided on a button deck for the gaming device 10. Additionally and alternatively one or both of the primary and secondary game displays 14, 18 may include touch screen input devices as are known in the art. Buttons, selections or inputs are displayed at the primary and secondary game displays 14, 18 and the player touching those icons or designated areas provides the required or desired input to configure and play the gaming device 10.

Other peripherals or associated equipment for the gaming device 10 include a bill/voucher acceptor 24 which reads and validates currency and vouchers for the player to establish credits for gaming on the gaming device 10 and one or more speakers 26 to provide audio content to the player in association with the game play. To provide for communication between the gaming device 10 and a casino system, a player tracking module (PTM) 28 is mounted on the cabinet 12. PTM 28 has a PTM display 30 to display system related information to the player. The PTM display 30 may be a small LCD, plasma or OLED display with touch screen functionality to enable the player to communicate with the system. In an embodiment the user interfaces described herein are displayed at the PTM display 30; however, as set forth below these presentations can be migrated to the primary or secondary displays 14, 18. A card reader 32 is provided to read a machine readable component on a player loyalty card (not shown) issued to the player to identify the player to the casino system as in known in the art. A ticket printer 36 may be provided as well on the PTM 28 or elsewhere on the gaming device 10 to provide printed value ticket vouchers to players when they cash out as is also known in the art.

The display and functionality of the PTM 28 may be migrated to the primary display 18 as is disclosed in Kelly et al, U.S. Pat. No. 8,241,123 titled "Video Switcher and Touch Router Method for a Gaming Machine" issued Aug. 14, 2012 and Kelly et al U.S. Pat. No. 8,241,124 titled "Gaming Machine Having a Curved Display With a Video Switcher and Touch Router System," issued Aug. 14, 2012 the disclosures of which are hereby incorporated by reference. According to these disclosures system and externally based content may be displayed at one or more of the primary or secondary displays 14, 18 dispensing with the need for the PTM display 30. Accordingly it should be understood that the display of information recited herein could be displayed at regions at one or more of the primary or secondary displays 14, 18 in lieu of display at the PTM display 30. While the player may use the buttons 20 to prompt play of the game (or the touch screen input), alternatively the player may use a handle 34 to prompt an input as is known in the art.

Cabinet 12 may be a self-standing unit that is generally rectangular in shape and may be manufactured with reinforced steel or other rigid materials which are resistant to tampering and vandalism. Any shaped cabinet may be implemented with any embodiment of gaming device 10 so long as it provides access to a player for playing a game. For example, cabinet 12 may comprise a slant-top, bar-top, or table-top style cabinet, including a Bally Cinevision™ or CineReels™ cabinet. The gaming device 10 may include a controller and memory disposed within the cabinet 12 or may have thin client capability such as that some of the computing capability is maintained at a remote server.

The plurality of player-activated buttons 22 may be used for various functions such as, but not limited to, selecting a wager denomination, selecting a game to be played, selecting a wager amount per game, initiating a game, or cashing out money from gaming machine 10. Buttons 22 may be operable as input mechanisms and may include mechanical buttons, electromechanical buttons or touch screen buttons. In one or more embodiments, buttons 22 may be replaced with various other input mechanisms known in the art such as, but not limited to, touch screens, touch pad, track ball, mouse, switches, toggle switches, or other input means used to accept player input. For example, one input means is as disclosed in U.S. Pub. App. 2011/0111853, entitled "Universal Button Module," filed on Jan. 14, 2011 and/or U.S. Pub. App. 2010/0113140 entitled "Gesture Enhanced Input Device" filed Nov. 16, 2009 which are hereby incorporated by reference. Player input may also be by providing touch screen functionality at the primary game display 14 and/or secondary game display 18.

The primary game display 14 may present a primary game of chance wherein, for a wager, a player receives one or more outcomes from a set of potential outcomes. For example, one such game of chance is a video slot machine game. In other aspects of the disclosed embodiments, gaming machine 10 may present a video or mechanical reel slot machine, a video keno game, a lottery game, a bingo game, a Class II bingo game, a roulette game, a craps game, a blackjack game, a mechanical or video representation of a wheel game or the like. The primary game display 14 and/or secondary display 18 may also display feature or secondary games triggered by various events such as symbol combinations or outcomes from a base game or a mystery event as described above. In a casino environment the base game is most often a pay-to-play (P2P) game meaning that the player must stake a wager to receive either a winning or losing outcome. However the disclosed embodiments may also be implemented in "entertainment only" gaming environments.

While the gaming devices 10, as described above, are used at brick and mortar casino venues, various aspects of the disclosed embodiments may also be applied to remote gaming such as Internet and mobile gaming (whether P2P gaming or free, promotional gaming) as well as gaming in or about the casino venue using approved mobile devices such as tablets and the like.

Figure 2A:
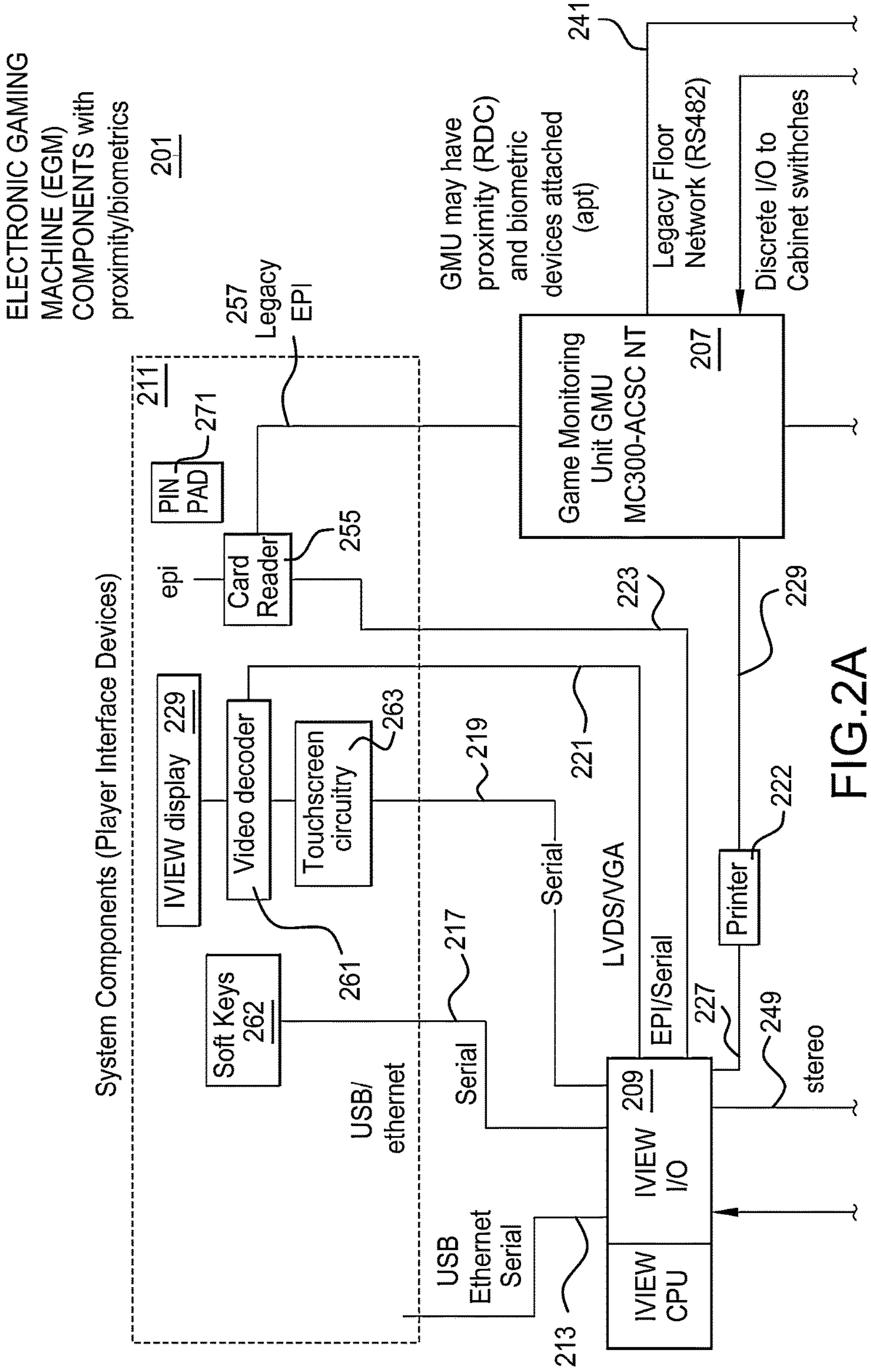
FIGS. 2A-B illustrate an example of a gaming terminal operational platform and components for a gaming terminal of the type of the disclosed embodiments.

Referring to FIGS. 2A, B, the gaming device 10 hardware 201 for the controller(s) is shown in accordance with one or more embodiments. The hardware 201 includes base game processor board 203 (EGM Processor Board) connected through serial bus line 205 to game monitoring unit (GMU) 207 (such as a Bally MC300 or ACSC NT manufactured and sold by Bally Gaming, Inc., Las Vegas, Nev.). EGM Processor Board 203 is connected to the PID 209 over bus line 249 and PID 209 is connected to the iView device such as 211 in FIG. 2A through bus lines 213, 217, 219, 221, 223. The PID 209 provides for communication between one or more gaming devices 10 and the casino system such as the type as hereinafter described. Inasmuch as gaming devices 10 may be manufactured by different entities, mounting like PTMs 28, 211 and PIDs 209 at each gaming device 10 provides for communication to the system in one or more common message protocols. Typically when a casino enterprise purchases a casino management system they also purchase the same manufacturer's PTMs 28, 211 and PIDs 209 which are then installed by the various manufacturers of the gaming devices 10 for the enterprise before delivery. In this manner the mountings for the PTMs 28, 211 on the gaming devices can be configured for location and esthetic appearance.

Figure 2B:
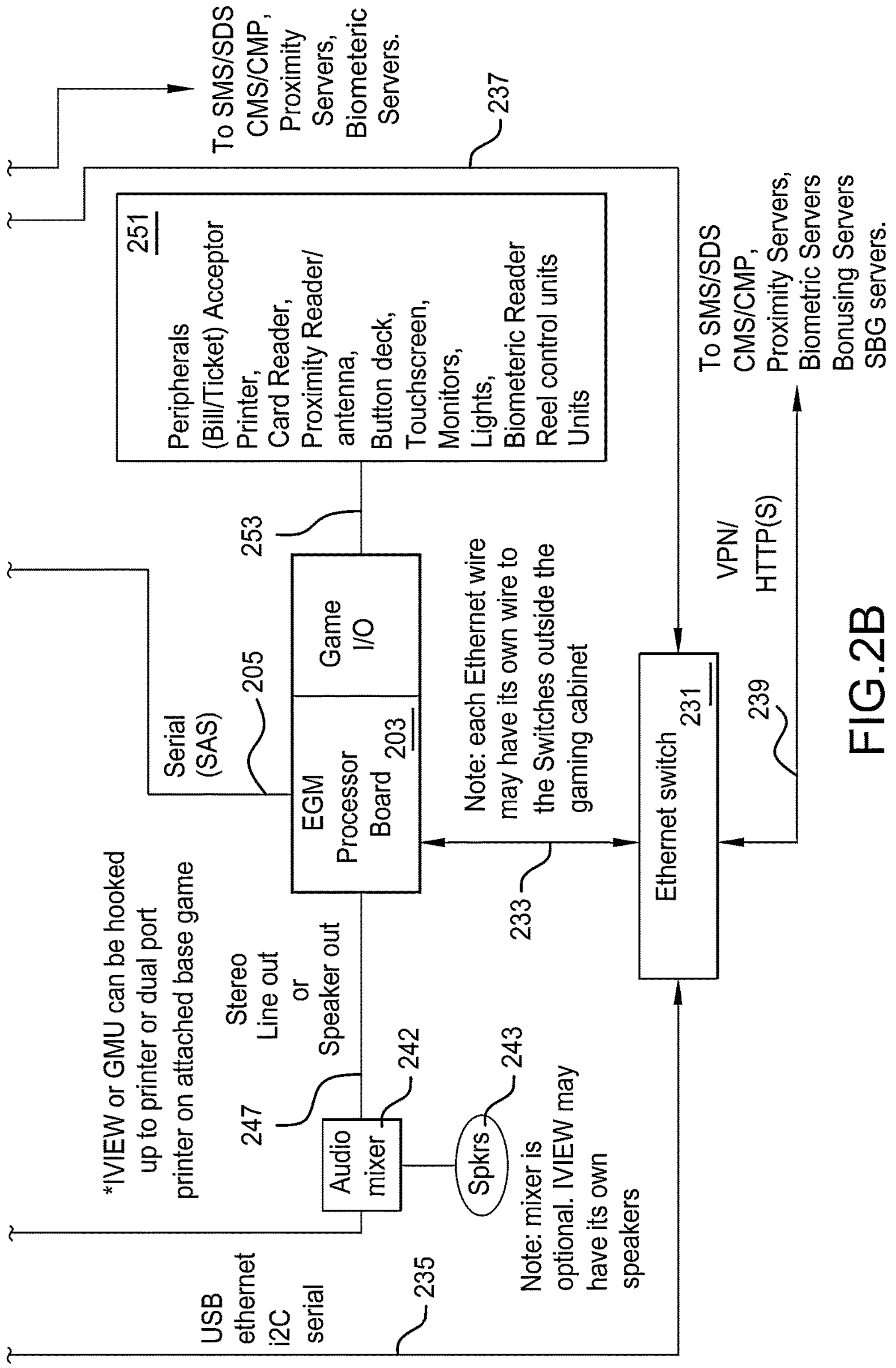

Gaming voucher ticket printer 36 (for printing player cash out tickets)(shown as 222 in FIG. 2A) is connected to PID 209 and GMU 207 over bus lines 227, 229. EGM Processor Board 203, PID 209 and GMU 207 connect to Ethernet switch 231 over bus lines 233, 235, 237. Ethernet switch 231 connects to a slot management system and a casino management system (SMS, SDS, CMS and CMP) (FIGS. 4A, 4B) network over bus line 239. Ethernet switch 231 may also connect to a server based gaming server or a downloadable gaming server. GMU 207 also may connect to the network over bus line 241. Speakers 26 (shown as 243 in FIG. 2B) produce sounds related to the game or connect through audio mixer 242 and bus lines 247, 249 to EGM Processor Board 203 and PID 209.

Peripherals 251 connect through bus 253 to EGM Processor Board 203. The peripherals 251 include, but are not limited to, the following and may include individual processing capability: bill/voucher acceptor 24 to validate and accept currency and ticket vouchers, the player interfaces such a button 20, primary and secondary game displays 14, 18 and any secondary or tertiary displays (with/without) touch screen functionality, monitors and lights. The peripherals 251 may include the displays as hereinafter described with reference to the various embodiments as herein described or their equivalents. For example, the bill/voucher acceptor 24 is typically connected to the game input-output board of the EGM processing board 203 (which is, in turn, connected to a conventional central processing unit ("CPU") board), such as an Intel Pentium® microprocessor mounted on a gaming motherboard.

The I/O board may be connected to CPU processor board 203 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. EGM processor board 203 executes a game program that causes the gaming device 10 to display and play a game. The various components and included devices may be installed with conventionally and/or commercially available components, devices, and circuitry into a conventional and/or commercially available gaming terminal cabinet 12.

When a player has inserted a form of currency such as, for example and without limitation, paper currency, coins or tokens, cashless tickets or vouchers, electronic funds transfers or the like into the currency acceptor, a signal is sent by way of bus 253 to the I/O board and to EGM processor board 203 which, in turn, assigns an appropriate number of credits for play in accordance with the game program. The player may further control the operation of the gaming machine by way of other peripherals 251, for example, to select the amount to wager via the buttons 20. The game starts in response to the player operating a start mechanism such as the handle 34, button 20 such as a SPIN/RESET button or a touch screen icon. The game program includes a random number generator to provide a display of randomly selected indicia on one or more displays such as the primary game display 14 as shown in FIG. 1.

In some embodiments, the random generator may be physically separate from gaming device 10; for example, it may be part of a central determination host system which provides random game outcomes to the game program. Finally, EGM processor board 203 under control of the game program and OS compares the outcome to an award schedule. The set of possible game outcomes may include a subset of outcomes related to the triggering and play of a feature or bonus game. In the event the displayed outcome is a member of this subset, EGM processor board 203, under control of the game program and by way of I/O Board, may cause feature/bonus game play to be presented on the primary game display 14 and/or any secondary display(s) 18.

Predetermined payout amounts for certain outcomes, including feature game outcomes, are stored as part of the game program. Such payout amounts are, in response to instructions from EGM processor board 203, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In an embodiment, the remote storage device is housed in a remote server such as a downloadable gaming server. The gaming machine may access the remote storage device via a network connection, including but not limited to, a local area network connection, a TCP/IP connection, a wireless connection, or any other means for operatively networking components together. Optionally, other data including graphics, sound files and other media data for use with the gaming terminal are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the gaming terminal using USB, serial or Ethernet connections. Each of the respective devices may have upgrades to their firmware utilizing these connections.

GMU 207 includes an integrated circuit board and GMU processor and memory including coding for network communications, such as the G2S (game-to-system) protocol from the Gaming Standards Association, Las Vegas, Nev., used for system communications over the network. As shown, GMU 207 may connect to the card reader 32 (shown as 255 in FIG. 2A) through bus 257 and may thereby obtain player information and transmit the information over the network through bus 241. Gaming activity information may be transferred by the EGM Processor Board 203 to GMU 207 where the information may be translated into a network protocol, such as S2S, for transmission to a server, such as a player tracking server, where information about a player's playing activity may be stored in a designated server database. This information may include time, machine identification data, coin-in, coin-out, jackpots or other information.

PID 209 includes an integrated circuit board, PID processor (iView CPU), and memory which includes an operating system, such as Windows CE, a player interface program which may be executable by the PID 209 processor together with various input/output (I/O) drivers for respective devices which connect to PID processor and which may further include various games or game components playable on PTM 28, 211 or playable on a connected network server and PTM 28, 211 is operable as the player interface. PID 209 connects to card reader 32 (shown as 255 in FIG. 2A) through bus 223, player tracking display 30 (shown as iView display 229 in FIG. 2A) through video decoder 261 and bus 221, such as an LVDS or VGA bus.

As part of its programming, the PID 209 processor executes coding to drive player tracking display 30, 229 and provide messages and information to a player. Touch screen circuitry 263 interactively connects PTM display 30, 229 and video decoder 261 to PTM 28, 211 such that a player may input information and causes the information to be transmitted either on the player's initiative or responsive to a query. Additionally soft keys 262 connect through bus 217 to PID 209 and operate together with the player tracking display 30 to provide information or queries to a player and receive responses or queries from the player. PID 209, in turn, communicates over the CMS/SMS network through Ethernet switch 231 and busses 235, 239 and with respective servers, such as a player tracking server.

PTMs 28 provide a link between the virtual private WAN/LAN network of the system components and the gaming terminal 10. The system components include the player tacking module 28 (e.g. Bally iVIEW® device) ("iView" is a registered trademark of Bally Gaming, Inc.), PID 209, EGM processing board 203 and game monitoring unit (GMU) processing board 207. These system components may connect over a network to the slot management system (such as a commercially available Bally SDS/SMS) and/or casino management system (such as a commercially available Bally CMP/CMS).

The GMU 207 system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to installation on the system components.

The system components include the PTM 28 processing board (PID 209) and game monitoring unit (GMU) 207. The GMU 207, PID 209 and PTM 28 can be combined into one like the commercially available Bally GTM iVIEW device. The PTM 28 may also interface with a switcher and router device of the type described above. In such case, instead of providing the PTM display 30, the switcher and router device provides for the content normally displayed at the PTM display 30 to be displayed at one or more of the primary or secondary displays 14, 18.

Figure 3:
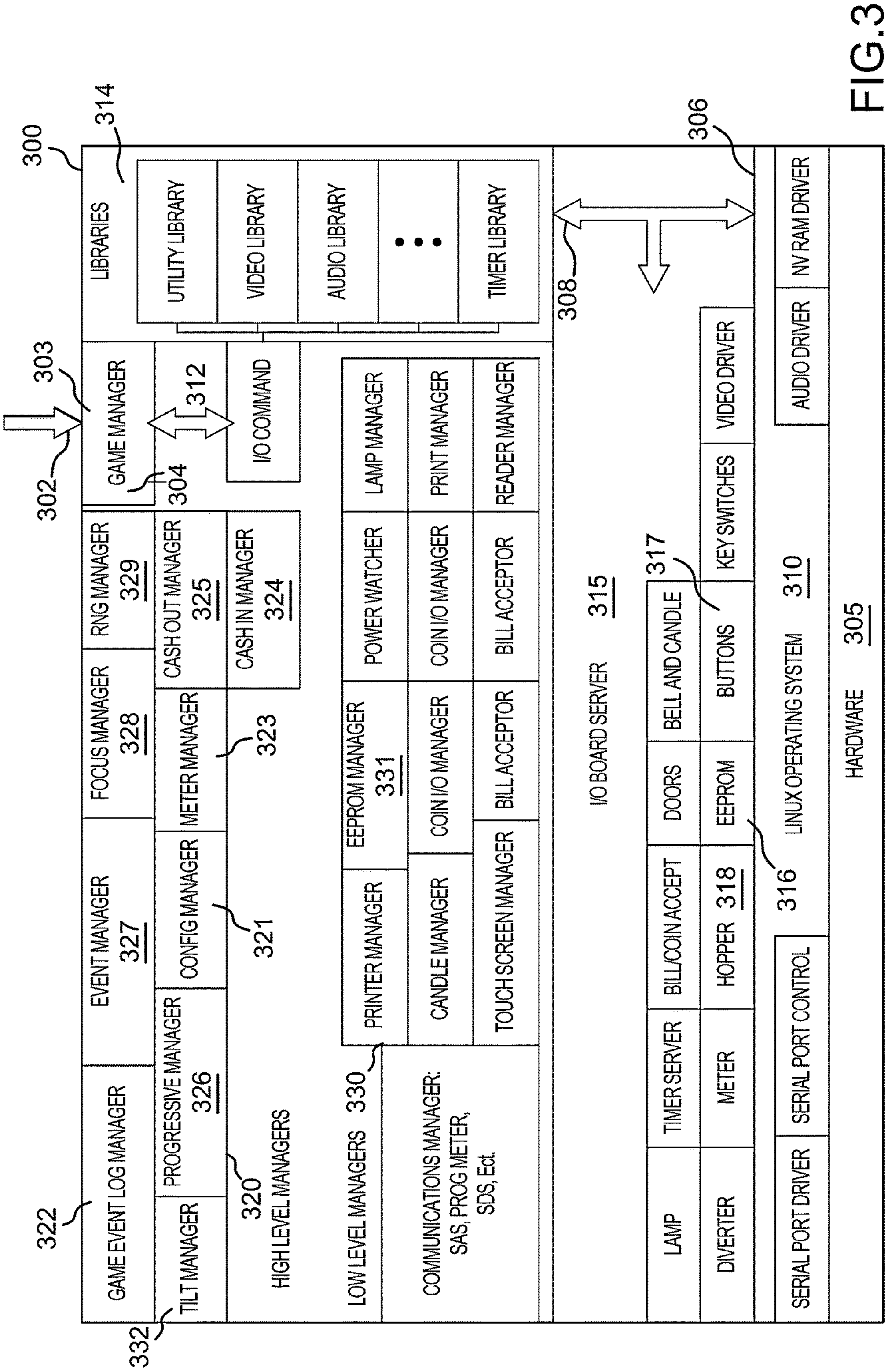
FIG. 3 is a block diagram of the logical components of a gaming kernel for a gaming terminal.

In accordance with one or more embodiments, FIG. 3 is a functional block diagram of a gaming kernel 300 of a game program under control of gaming device EGM processor board 203. The game program uses gaming kernel 300 by calling into application programming interface (API) 302, which is part of game manager 304. The components of game kernel 300 as shown in FIG. 3 are only illustrative, and should not be considered limiting. For example, the number of managers may be changed, additional managers may be added or some managers may be removed without deviating from the scope and spirit of the disclosed embodiments.

As shown in the example, there are three layers: a hardware layer 306; an operating system layer 308, such as, but not limited to, Linux; and a game kernel layer having game manager 304 therein. In one or more embodiments, the use of an operating system layer 310, such as a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel 300 executes at the user level of the operating system layer 308, and itself contains a major component called the I/O board server 315. To properly set the bounds of game application software (making integrity checking easier), all game applications interact with gaming kernel 300 using a single API 302 in game manager 304. This enables game applications to make use of a well-defined, consistent interface, as well as making access points to gaming kernel 300 controlled, where overall access is controlled using separate processes.

For example, game manager 304 parses an incoming command stream and, when a command dealing with I/O comes in (arrow 312), the command is sent to an applicable library routine 314. Library routine 314 decides what it needs from a device, and sends commands to I/O board server 310 (see arrow 308). A few specific drivers remain in operating system layer 310's kernel, shown as those below line 306. These are built-in, primitive, or privileged drivers that are (i) general (ii) kept to a minimum and (iii) are easier to leave than extract. In such cases, the low-level communications is handled within operating system layer 310 and the contents passed to library routines 314.

Thus, in a few cases library routines may interact with drivers inside operating system layer 310, which is why arrow 308 is shown as having three directions (between library routines 314 and I/O board server 315, or between library routines 314 and certain drivers in operating system layer 306). No matter which path is taken, the logic needed to work with each device is coded into modules in the user layer of the diagram. Operating board server layer 306 is kept as simple, stripped down, and common across as many hardware platforms as possible. The library utilities and user-level drivers change as dictated by the game cabinet or game machine in which it will run. Thus, each game cabinet or game machine may have an industry standard EGM processing board 203 connected to a unique, relatively dumb, and as inexpensive as possible I/O adapter board, plus a gaming kernel 300 which will have the game-machine-unique library routines and I/O board server 315 components needed to enable game applications to interact with the gaming machine cabinet. Note that these differences are invisible to the game application software with the exception of certain functional differences (i.e., if a gaming cabinet has stereo sound, the game application will be able to make use of API 302 to use the capability over that of a cabinet having traditional monaural sound).

Game manager 304 provides an interface into game kernel 300, providing consistent, predictable, and backwards compatible calling methods, syntax, and capabilities by way of game application API 302. This enables the game developer to be free of dealing directly with the hardware, including the freedom to not have to deal with low-level drivers as well as the freedom to not have to program lower level managers 330, although lower level managers 330 may be accessible through game manager 304's interface if a programmer has the need. In addition to the freedom derived from not having to deal with the hardware level drivers and the freedom of having consistent, callable, object-oriented interfaces to software managers of those components (drivers), game manager 304 provides access to a set of high level managers 320 also having the advantages of consistent callable, object-oriented interfaces, and further providing the types and kinds of base functionality required in casino-type games. Game manager 304, providing all the advantages of its consistent and richly functional game application API 302 as supported by the rest of game kernel 300, thus provides a game developer with a multitude of advantages.

Game manager 304 may have several objects within itself, including an initialization object (not shown). The initialization object performs the initialization of the entire game machine, including other objects, after game manager 304 has started its internal objects and servers in appropriate order. In order to carry out this function, the kernel's configuration manager 321 is among the first objects to be started; configuration manager 321 has data needed to initialize and correctly configure other objects or servers.

The high level managers 320 of game kernel 300 may include game event log manager 322 which provides, at the least, a logging or logger base class, enabling other logging objects to be derived from this base object. The logger object is a generic logger; that is, it is not aware of the contents of logged messages and events. The game event log manager's 322 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 323 manages the various meters embodied in the game kernel 300. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 323 receives its initialization data for the meters, during start-up, from configuration manager 321. While running, the cash in manager 324 and cash out manager 325 call the meter manager's 323 update functions to update the meters. Meter manager 323 will, on occasion, create backup copies of the soft meters by storing the soft meters' readings in EEPROM. This is accomplished by calling and using EEPROM manager 331.

In accordance with still other embodiments, progressive manager 336 manages progressive games playable from the game machine. Event manager 327 is generic, like game event log manager 327, and is used to manage various gaming machine events. Focus manager 328 correlates which process has control of various focus items. Tilt manager 332 is an object that receives a list of errors (if any) from configuration manager 321 at initialization, and during game play from processes, managers, drivers, etc. that may generate errors. Random number generator manager 329 is provided to allow easy programming access to a random number generator (RNG), as a RNG is required in virtually all casino-style (gambling) games. Random number generator manager 329 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 325 has the responsibility of configuring and managing monetary output devices. During initialization, cash out manager 325, using data from configuration manager 321, sets the cash out devices correctly and selects any selectable cash out denominations. During play, a game application may post a cash out event through the event manager 327 (the same way all events are handled), and using a call back posted by cash out manager 325, cash out manager 325 is informed of the event. Cash out manager 325 updates the credit object, updates its state in non-volatile memory, and sends an appropriate control message to the device manager that corresponds to the dispensing device.

As the device dispenses dispensable media, there will typically be event messages being sent back and forth between the device and cash out manager 325 until the dispensing finishes, after which cash out manager 325, having updated the credit manager and any other game state (such as some associated with meter manager 323) that needs to be updated for this set of actions, sends a cash out completion event to event manager 327 and to the game application thereby. Cash in manager 324 functions similarly to cash out manager 325, only controlling, interfacing with, and taking care of actions associated with cashing in events, cash in devices, and associated meters and crediting.

In a further example, in accordance with one or more embodiments, I/O board server 315 may write data to the gaming machine EEPROM memory, which is located in the gaming machine cabinet and holds meter storage that must be kept even in the event of power failure. Game manager 304 calls the I/O library functions to write data to the EEPROM. The I/O board server 315 receives the request and starts a low priority EEPROM manager 331 thread within I/O board server 315 to write the data. This thread uses a sequence of 8 bit command and data writes to the EEPROM device to write the appropriate data in the proper location within the device. Any errors detected will be sent as IPC messages to game manager 304. All of this processing is asynchronous.

In accordance with one embodiment, button module 317 within I/O board server 315, polls (or is sent) the state of buttons every 2 milliseconds. These inputs are debounced by keeping a history of input samples. Certain sequences of samples are required to detect a button was pressed, in which case the I/O board server 315 sends an inter-process communication event to game manager 304 that a button was pressed or released. In some embodiments, the gaming machine may have intelligent distributed I/O which debounces the buttons, in which case button module 317 may be able to communicate with the remote intelligent button processor to get the button events and simply relay them to game manager 304 via IPC messages. In still another embodiment, the I/O library may be used for payout requests from the game application. For example, hopper module 318 must start the hopper motor, constantly monitor the coin sensing lines of the hopper, debounce them, and send an IPC message to the game manager 304 when each coin is paid.

Further details, including disclosure of lower level fault handling and/or processing, are included in U.S. Pat. No. 7,351,151 issued Apr. 1, 2008 entitled "Gaming Board Set and Gaming Kernel for Game Cabinets" the disclosure of which is incorporated herein by explicit reference.

Gaming Enterprise System:

The following system description is directed toward a brick and mortar casino environment. It should be understood however, that while the various embodiments are keenly adapted to the physical casino environment that they apply equally to virtual wagering (P2P and entertainment only) environments as well.

Figure 4A:
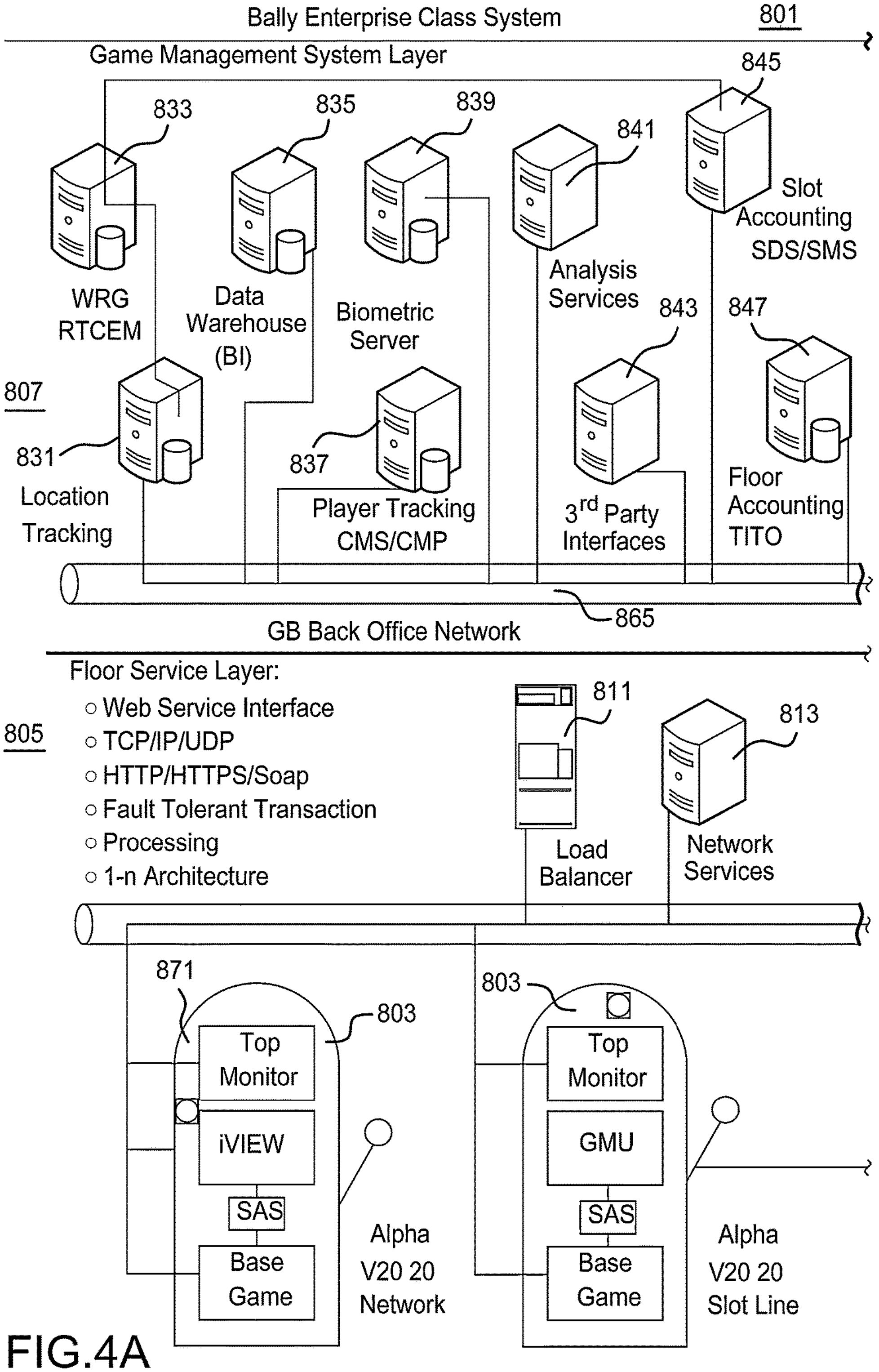
FIGS. 4A and 4B is a schematic of an example of a casino enterprise network incorporating gaming terminals.
Figure 4B:
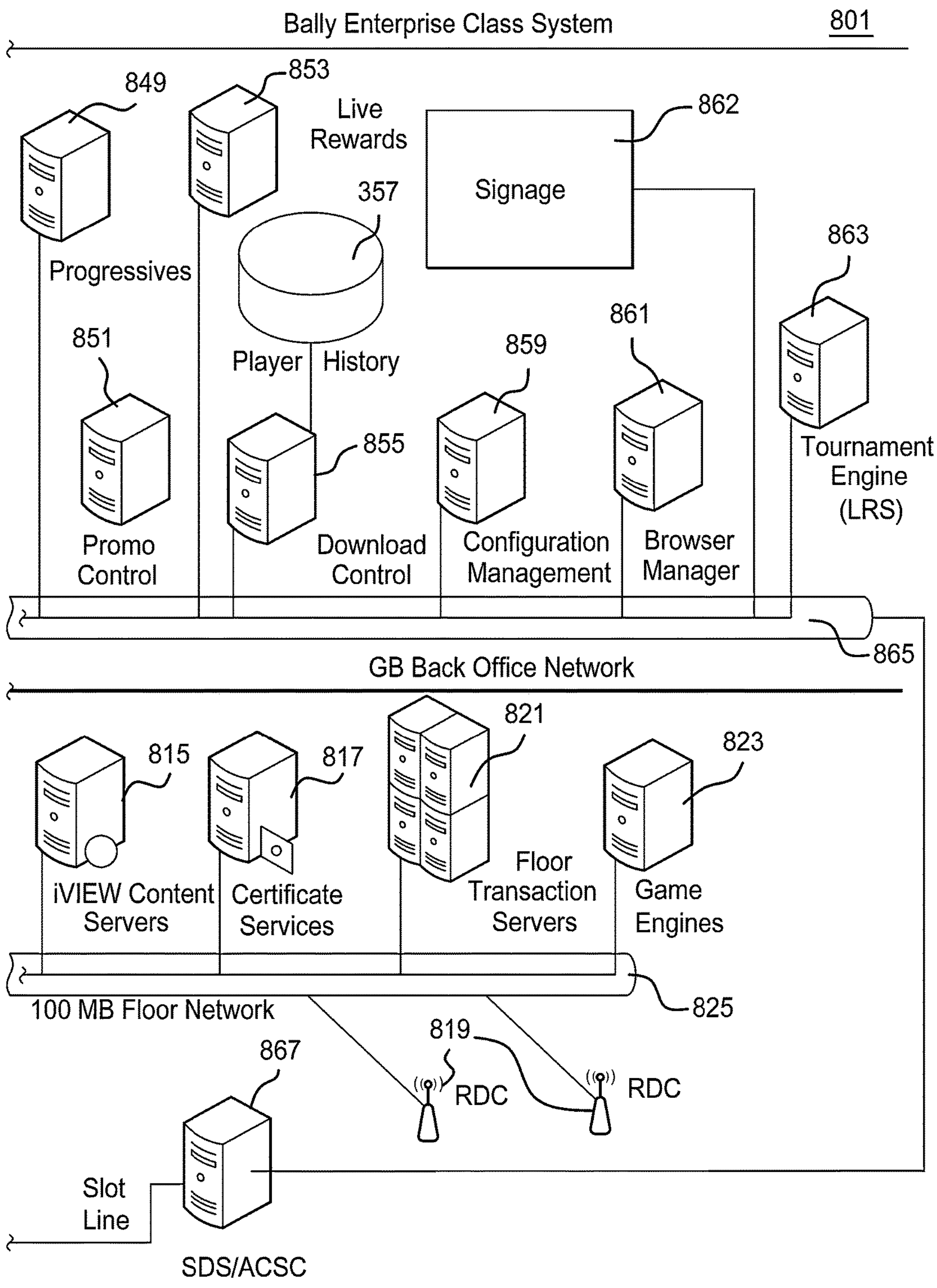

Referring to FIGS. 4A and B, an example of a gaming enterprise system 801 is shown in accordance with one or more embodiments. Gaming enterprise system 801 may include one casino or multiple locations (herein referred to collectively as a casino enterprise) and generally includes a network of gaming terminals 803 (including gaming devices 10 of the type as described in FIG. 1), floor management system (SMS) 805, and casino management system (CMS) 807. SMS 805 may include load balancer 811, network services server 813, player tracking module 28, iView (PTM 28), content servers 815, certificate services server 817, floor radio dispatch receiver/transmitters (RDC) 819, floor transaction servers 821 and game engines 823 (where the gaming terminals 803 operate server based, server supported or downloadable games), each of which may connect over network bus 825 to gaming terminals 803. CMS 807 may include location tracking server 831, WRG RTCEM (William Ryan Group Real Time Customer Experience Management from William Ryan Group, Inc. of Sea Girt, N.J.) server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming terminals 803.

The various servers and gaming terminals 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming terminals 803. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

The gaming terminals 803 include various peripheral components that may be connected with USB, serial, parallel, RS-485 or Ethernet devices/architectures to the system components within the respective gaming machine. The GMU (shown as GMU 206 in FIG. 2A) has a connection to the base game through a serial SAS connection. The system components in the gaming cabinet may be connected to the servers using HTTPs or G2S protocols over Ethernet. Using CMS 807 and/or SMS 805 servers and devices, firmware, media, operating systems, and configurations may be downloaded to the system components of respective gaming devices for upgrading or managing floor content and offerings in accordance with operator selections or automatically depending upon CMS 807 and SMS 805 master programming. The data and programming updates to gaming terminals 803 are authenticated using conventional techniques prior to install on the system components.

In various embodiments, any of the gaming devices 803 may be a mechanical reel spinning slot machine, video slot machine, video poker machine, video Bingo machine, Keno machine, or a gaming device offering one or more of the above described games including an interactive wheel feature. Alternately, gaming devices 803 may provide a game with an accumulation-style feature game as one of a set of multiple primary games selected for play by a random number generator, as described above. A gaming system 801 of the type described above also allows a plurality of games in accordance with the disclosed embodiments to be linked under the control of a group game server (not shown) for cooperative or competitive play in a particular area, carousel, casino or between casinos located in geographically separate areas. For example, one or more examples of group games under control of a group game server are disclosed in Vallejo et al U.S. Published Application 2008/0139305, entitled "Networked System and Method for Group Gaming," filed on Nov. 9, 2007, which is hereby incorporated by reference in its entirety for all purposes.

The gaming system 801, among other functionalities such as slot accounting (i.e. monitoring the amount wagered ("drop"), awards paid) and other casino services, includes the player tracking CMS/CMP server 837 and/or data structure warehouse 835 storing, in individual player accounts, predetermined types of data. This data includes personal data for players enrolled in the casino players club sometimes referred to as a loyalty club. An example of the personal data is the player's name, address, SSN, birth date, spouse's name and perhaps personal preferences such as types of games, preferences regarding promotions, a player's commercial activity such as wagers made during a gaming session and other tracked spending (hotel, dining, services such a spa) a player rating level usually based at least in part on the player's "spend" with the casino, particularly for gaming, available player comp points (points accumulated also based at least in part upon commercial "spend" activity and which may be redeemed or converted into cash or redeemed in exchange for services or merchandise) and the like. As is known in the industry, at enrollment, the player is assigned a created player account in the player tracking CMS/CMP server 837 and is issued a player tracking card having a machine readable magnetic stripe to tie the player to the activity and their account.

When a player plays a gaming device 10 (or terminal 803) (hereinafter collectively referred to as gaming devices 10), he/she inserts their player tracking card into the card reader 32 (FIG. 1) which communicates data to the CMS/CMP server 837 to accumulate activity data such as wagers (perhaps cumulative wagers between insertion of the card and removal of the card or a time-out period where no wagers have been made), wins or jackpots, session time, gaming terminal associated with the session and the like. As described below, this information may be used to determine the eligibility of the gaming device 10 being played by the player for the community game features.

The system 801 may also include electronic transfer of funds functionality. For example, a player having accumulated $100 at a gaming terminal 10 may decide to "cash out" to play another gaming terminal 10. The player may use the PTM 28 to initiate communication with the system 801 (e.g., server 837) to upload the value from the gaming terminal 10 into an electronic account associated with the player's account. The player may choose to upload all or a portion of the funds to the player's established electronic account. The system would prompt the player to enter their PIN (or obtain biometrical confirmation as to the player's identity) and upload the chosen amount to their account. When the player moves to another gaming terminal 10 he/she inserts their player loyalty card into the card reader 32 to access their account. A prompt enables the player to request funds from their account. Entering their PIN (or biometric identifier), the player can input the desired amount which is downloaded to their gaming terminal 10 for play.

Figure 5:
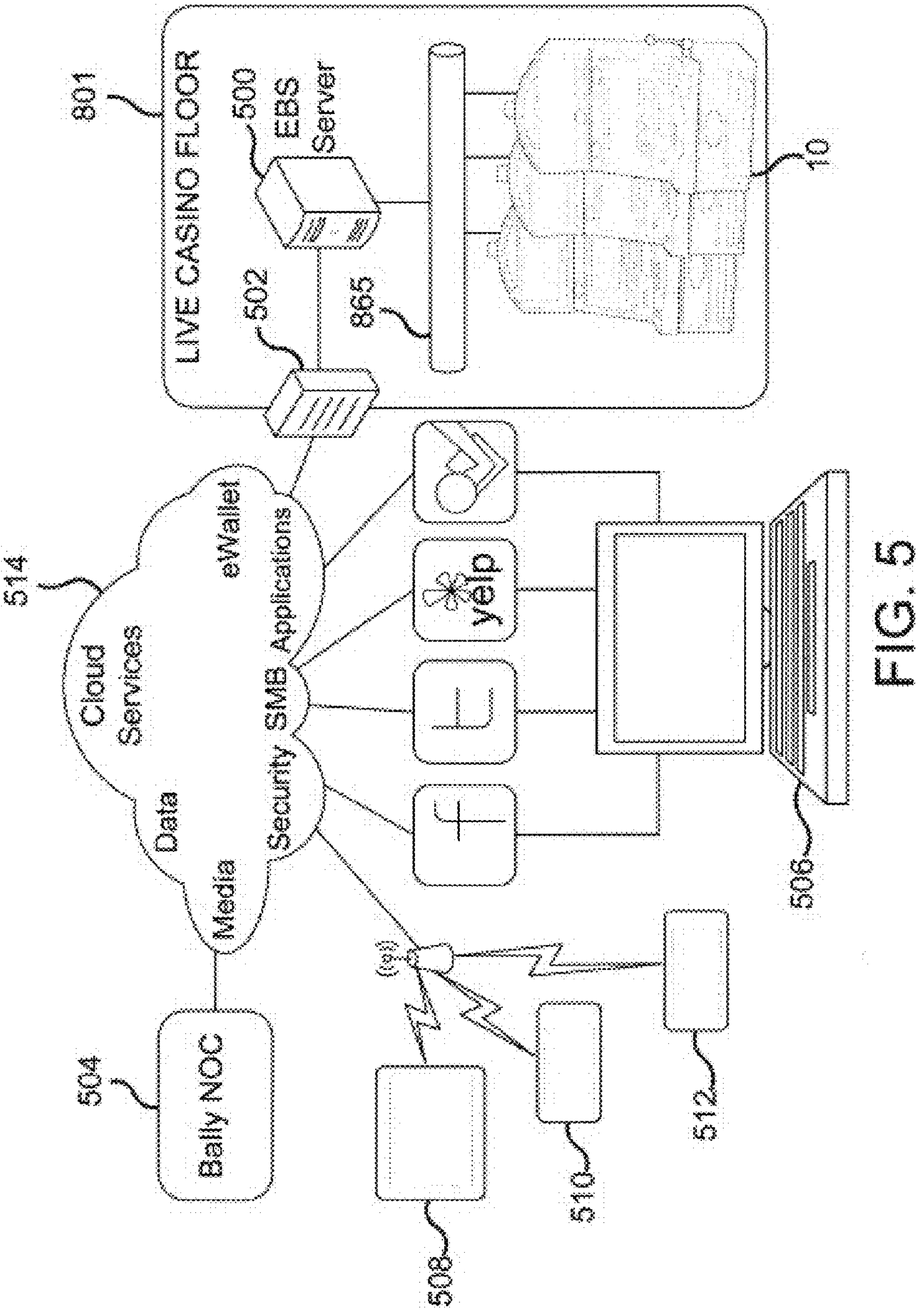
FIG. 5 is a diagram showing an example of an architecture for tying a casino enterprise network to an external provider of games and content to Internet or broadband communication capable devices.

Portions of the disclosed embodiments may be implemented, augmented or promoted by or through a system as suggested in FIG. 5. At 801 is the gaming enterprise system which may be hosted at a casino property enterprise, across several casino enterprises or by a third party host. As described above, the gaming enterprise system 801 has a network communication bus 865 providing for communication between the gaming devices 10 and various servers as described above with respect to FIGS. 4A, B. To provide the functionality illustrated in FIG. 5, a host server 500, such as a Bally Elite Bonusing Server (EBS), is connected to the network communication bus 865 for communication to the gaming system 801, the gaming devices 10 and the various servers and other devices as described above. Through a secure network firewall 502 the host server 500 is in communication with a cloud computing/storage service 514 which may be hosted by the casino enterprise, a licensed third party or if permitted by gaming regulators an unlicensed provider. For example, the cloud service 514 may be as provided by Microsoft® Private Cloud Solutions offered by Microsoft Corp. of Redmond, Wash., USA.

The cloud service 514 provides various applications which can be accessed and delivered to, for example, personal computers 506, portable computing devices such as computer tablets 508, personal digital assistants (PDAs) 510 and cellular devices such as telephones and smart phones 512. For example, the cloud service 514 may provide and support the enterprise applications in association with the feature server 500. The cloud service 513 may also facilitate the delivery of content to user/players by supporting updates and advertising through the enterprise applications to the remote device user/player. The cloud service 514 includes security provide for secure communication with the cloud service 514 between the player/users and the cloud service 514 and between the cloud service 514 and the gaming enterprise system 801. Security applications may be through encryption, the use of personal identification numbers (PINS), biometric identification, location determination or other devices and systems. As suggested in FIG. 5, the cloud service 515 stores or accesses player/user data retrieved from players/users and from the gaming enterprise system 801 and host server 500 and associated one or more data structures.

The players/users may access the cloud service 514 and the applications and data provided thereby through the Internet or through broadband wireless cellular communication systems and any intervening short range wireless communication such as WiFi, NFC, Bluetooth or the like. The players/users may access the applications and data through various social media offerings such as Facebook, Twitter, Yelp, MySpace or LinkedIn or the like. As described herein, the cloud service 514 and enterprise system 801 provides a vehicle through which (a) player group accounts may be initiated, amended or closed, (b) individual and group data may be accessed and viewed, (c) group activities may be supported such a constituent player spending (to perhaps book a stay at the casino enterprise) or group eWallet funding, (d) the enterprise can market to the players, and (e) tournament activities may be established or supported, or the like.

On an individual basis, as but an example, a player/user may have an established player account with a casino enterprise. That account may include data such as the player's credit level, their rating and their available comps. At their smart phone 512, the player/user sends a request to the cloud service 514 (perhaps through a previously downloaded application) to request a status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN or some other unique identifier such as a biometric identifier or tag. The cloud service 514 forwards the inquiry to the host server 500 which, in turn, confirms the identification and retrieves the requested information from the data warehouse 835 or player history database 857 or player tracking CMS/CMP server 837. The information is formatted by the cloud service 514 application and delivered to the player/user. The delivery may be formatted based upon the player/user's device operating system (OS), display size or the like.

The cloud service 514 may also host game applications to provide virtual instances of games for free, promotional, or where permitted, P2P (Pay to Play) supported gaming. Third party developers may also have access to placing applications with the cloud service 514 through, for example, a national operations center (Bally NOC 504). A game software manufacturer such as Bally Gaming, Inc. may also provide game applications on its own or on behalf of the casino enterprise.

Other media such as advertising, notices (such as an upcoming tournament) promotions and surveys may also be provided to and through the cloud service 514. When a player/user accesses the cloud service 514 certain media may be delivered to the player/user in a manner formatted for their application and device.

The cloud service 514 enables the casino enterprise to market to and foster player loyalty. To drive such interaction, various incentive programs may be employed including, as described above, users earning or being awarded mystery game chances which may be redeemed at their next visit to the casino enterprise or, where permitted, during play on their remote devices. As described herein the cloud service 514 enables the user/player to access and interact with their one or more virtual objects. Additionally, the cloud service 514 may be replaced or augmented with an Internet accessible enterprise web portal to provide the functionalities described herein.

Embodiments of Culturally Configured Awards:

In one aspect of the disclosed embodiments, any award to a player (where permitted) may be configured to be expressed in culturally favorable numerical digits. As but an example, in the Chinese culture the number "8" is deemed to be a lucky and favorable number whereas the number "4" is considered culturally unfavorable inasmuch as the Chinese word for "4" resembles the word for "death." In Western cultures the number "7" is deemed lucky whereas the number "13" is considered unlucky. This embodiment endeavors to, where possible and practicable, express awards to the players in culturally favorable number digits and to avoid awards expressed in culturally unfavorable digits.

This embodiment operates on awards which can be configured into multiple sub-component awards thereby enabling configurations of the awards into values expressed in favorable number sets. As but an example, the player may trigger or be provided with a total award T of 1000 credits. While the player may be pleased with the amount, the disclosed embodiments enable the award to be broken into sub-component awards of culturally favorable values of 778, 8, 68, 58 and 88; all having their least significant digit being an "8." Regarding the dividing of the award, certain pays to the player as those expressed as a single pay in a game pay table may not be able to be configured according to the various embodiments. However, awards such as awards from feature or secondary games or promotional funds given by the casino to the player or progressive awards may well be suited to such configurations. Also, as discussed below, awards from a community game may also be configured according to the various embodiments.

Figure 6:
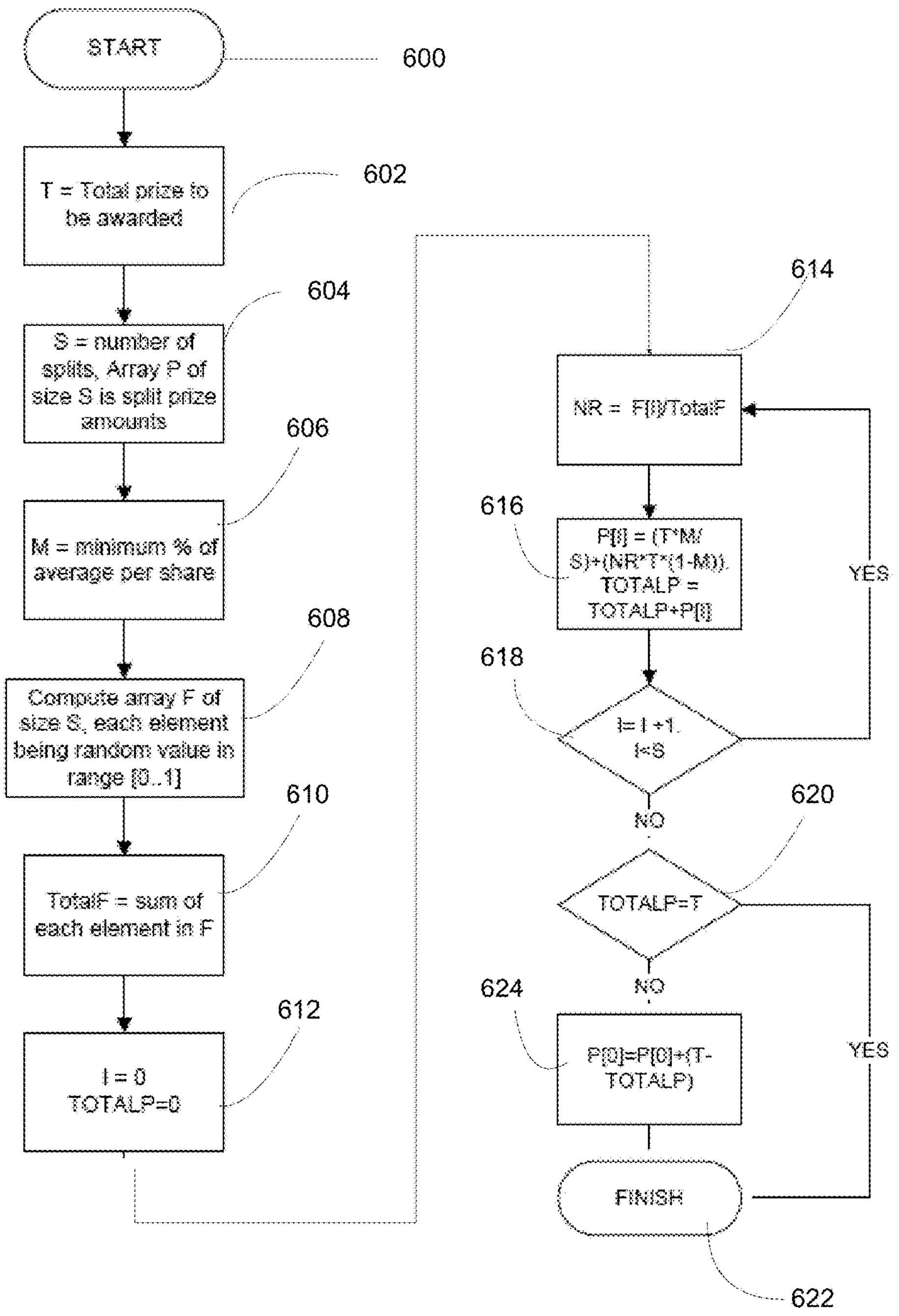
FIG. 6 is a logic diagram illustrating the system and process to initially split an award into sub-component awards.

Turning to FIG. 6, a non-limiting example of configuring an award T into culturally favorable expressed values will now be described. The algorithm expressed may be processed at the gaming device EGM processor board 203 (FIG. 2B) where the award is from the base/secondary game, iView CPU 209 where, for example, the award is from a system operated game or promotion, the progressive server 849 where the award is part or all of a progressive or from a separate controller installed in the gaming device 10. At 600, the process starts and at 602 the total prize T to be awarded is determined. T may be a game triggered award, a mystery award, a promotional award, a progressive award or the like. Where T is originally expressed in a culturally favorable value, it may be awarded as a single award. However, even where T is a culturally favorable value, the system and method may be used to divide the award T into multiple, culturally favorable amounts to provide the player with multiple prizes. For example, where the total award T is 1000 credits, the player may be presented with a secondary display from which to select icons revealing favorable prize amounts totaling 1000 credits; a "pick-a-prize" game.

At 604 a virtual array P is established having cells ("buckets") for each of the prize split S sub-component awards. In the example, S (the number of split sub-components) will be five splits, i.e. 5 sub-component awards. The number of splits S can vary; however having too few frustrates the cultural prize configuration and too many results in small sub-component prizes which may be annoying to the players. At 606, a minimum percentage M is defined and represents a percentage of the share of the award T which should be allocated to each sub-component. For example, if M=100% and S=5 then each bucket of P would contain exactly 200 credits (T/S). If M=50% and S=5, each bucket of the array P would contain a minimum of 100 credits. The purpose of M is to, when T is divided in random split amounts, that the buckets of P do not have too small of values. This prevents "edge cases" where the amounts in one or more buckets of P are too small to provide for favorable configuration and avoids too small of sub-component awards, i.e. the sub-component awards have an acceptable value spread.

At 608 another virtual array F of S cells ("buckets") is defined and each cell has assigned thereto a random number between 0 and 1. The random values are summed at 610 into a variable TotalF ($\text{TotalF}=\Sigma F_{1\text{-}S}$).

The values set into the buckets of the array P are then determined in an iterative fashion. The array is first "zeroed" at 612. At 614 the random numbers in the array F are normalized ($NR=F_{(I)}/\text{TotalF}$) and at 616 the sub-components of the award are computed through iterations through the array P and the amounts are assigned into the buckets of the virtual array P. Each element is determined at 616, based upon the assigned F value and subject to the minimum M, according to the following equation:

$$P(I)=(T^*M/S)+(NR^*T^*(1-M)) \quad \text{(EQN 1)}$$

At 616 as each value for the bucket or cell of the array is determined the iteration goes to the next bucket (cell). Fractional values (i.e. less than 1 credit) are inversely applied to one of the cells of the array P. A running total of the sum of the values is calculated by EQN 1 to check against the award value T.

$$\text{Total } P=\text{Total } P+P(I) \quad \text{(EQN 2)}$$

The iterative process continues at 618 as long as the iterations are less than the number of sub-component splits S (cells in the array P). If the iterative process is complete at 618 EQN 2 is checked at 620 to make sure the sum of the values in the buckets of the array P equal the award value T. If it is, then the splitting process is finished at 622. If Total P≠T at 624 the difference is added to a selected bucket in the array P.

At this point the award T has been divided into S splits of randomly based amounts above the minimum percentage M. The next step is to check and adjust the values of each split toward amounts which are expressed in culturally favorable number digits. For purposes of explanation it shall be assumed that the values are to be adjusted to be expressed in number digits deemed favorable in the Chinese culture. Thus, several adjustment rules may be adopted: value numbers ending in the digit "4" are to be discouraged and value numbers ending in the digit "8" are to be encouraged.

Figure 7:
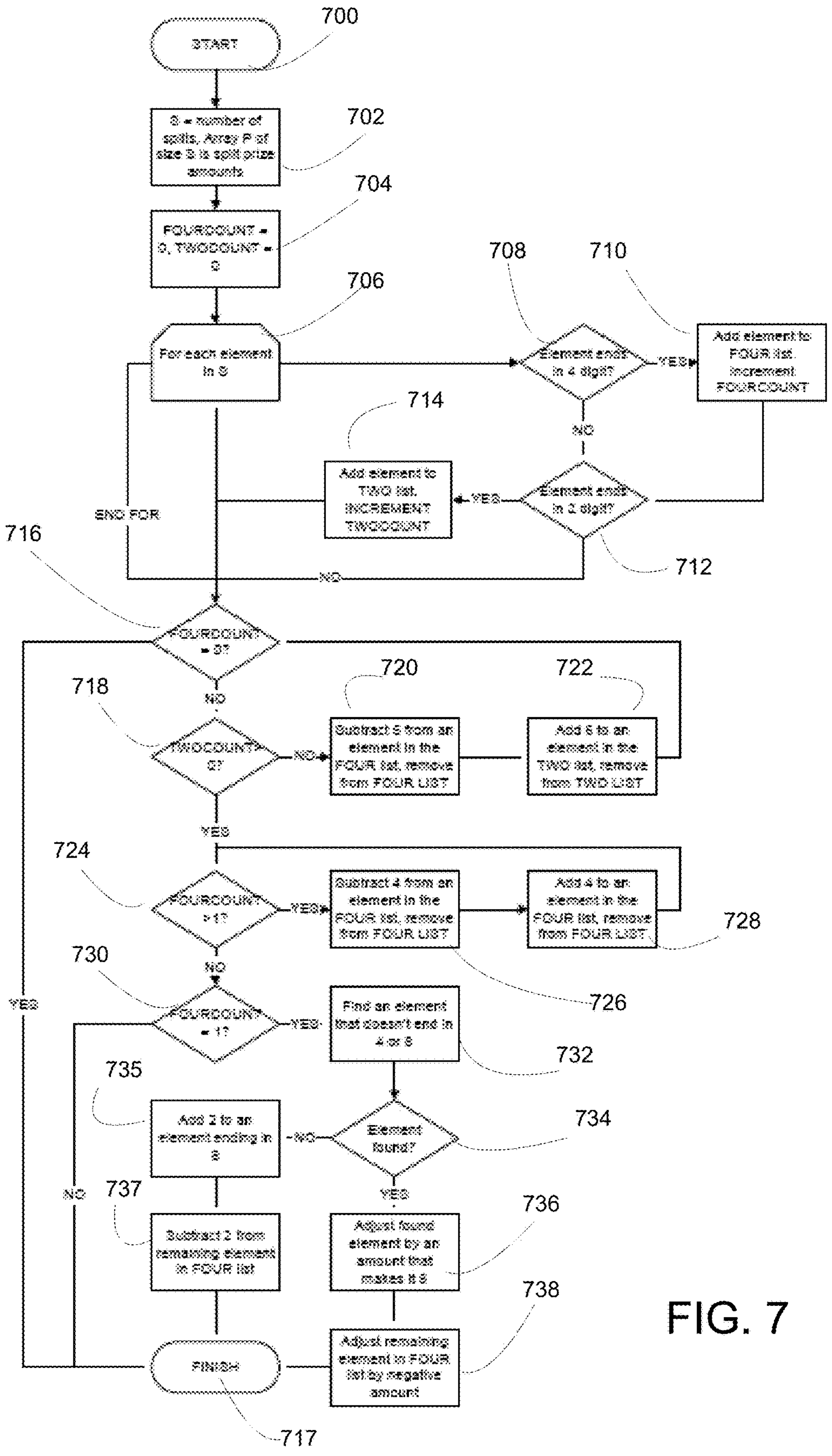
FIG. 7 is a logic diagram illustrating the adjustment of the values of the sub-components to reflect culturally favorable numerical digits and to avoid culturally unfavorable digits.

Turning to FIG. 7, the process for the adjustment will now be described. At 700 the process is started after the initial split S values have been determined according to the above. At 702 the process takes into account the number of splits S as well as the initial values assigned into the buckets of the array P (of size S) as disclosed with reference to FIG. 6. Inasmuch as the assignment of the split values into the buckets of the array P include a random element (the numbers of the array F), the initial values of each split will vary. At 704 a FOURCOUNT list and a TWOCOUNT list are initialized at zero. These lists will record an initial split value in the array P which has a "4" or a "2" (respectively) as their least significant digit. At 706 the processor examines each initial split value in the array P and if the value ends in a "4" at 708 at 710 adds that bucket or cell to the FOURCOUNT list. At 712 the processor examines the initial split values in the buckets of the array P for values ending in "2" and if such a value is found that cell or bucket is added to the TWOCOUNT list at 714.

By finding FOURCOUNT value buckets and TWOCOUNT value buckets they may be transformed into values by subtracting "6" credits from the FOURCOUNT to obtain a number having a last digit of "8" and adding those subtracted credits to a recorded TWOCOUNT value to likewise transform that value to a number also having a favorable last digit of "8." As an example if split P1=34 and split P2=72, it can be seen that six can be subtracted from "34" and added to "72" to make P1=28 and P2=78. Thus, the FOURCOUNT values and the TWOCOUNT value may be paired off for adjustment to obtain favorable values.

At 716, the processor determines if the FOURCOUNT list is "0." If it is, then there are no sub-component splits that end in the number "4" and the process is finished at 717. If there are one or more FOURCOUNT split values at 716 at 718 it is determined if the TWOCOUNT list is 0. If no, this means that there is at least one sub-component in the FOURCOUNT and TWOCOUNT lists which can be commonly adjusted. At 720 6 units (credits) are subtracted from one of the sub-components in the array listed in the FOURCOUNT list (resulting in the least significant digit going from a "4" (unfavorable) to an "8" (favorable) and at 722 "6" is added to one of the sub-components in the array listed in the TWOCOUNT list (resulting in the least significant digit going from a "2" to an "8" (favorable).

The process returns to 716 iteratively until either (1) all sub-component values of S in the FOURCOUNT list have been eliminated and the process is terminated at 717 or (2) all of the elements listed in the TWOCOUNT list have been eliminated; meaning that pairing with FOURCOUNT listed items as described above is not available. If all of the TWOCOUNT values in the list have been used to transform FOURCOUNT elements at 724, it is determined if there are one or more values listed in the FOURCOUNT list. If there are more than one, at 726 "4" is subtracted from a FOURCOUNT listed value and at 728 "4" is added to another remaining FOURCOUNT listed value.

This process iterates until at 730 there are no more FOURCOUNT listed values whereupon the process terminates at 717 or there is only one such value left on the list. If there is one FOURCOUNT value remaining, at 732 the other values of the array are searched at 732 for one that does not end in "8." If such a value is found at 734, e.g. a value that has a least significant digit of "5," that found value is adjusted at 736 to an "8" by adding "3" and at 738 subtracting "3" from the remaining FOURCOUNT value. The process is then at 717 finished. If at 734 no sub-component, split value is found which does not end in an "8," at 740 "2" is added to a sub-component, split value that ends in "8" and at 742 "2" is subtracted from the remaining FOURCOUNT sub-component, slit value rendering it to a "2." At 717 the process is concluded.

If at 734 there is one value in the FOURCOUNT list and no value in the array is found that does not end in a "4" or "8," at 735 "2" is added to a value ending in "8" resulting in a value that has the least significant digit as a "0" and at 737 "2" is subtracted from the remaining value in the FOURCOUNT list resulting in that value going to "2." At 717 the process is finished.

As can be appreciated the foregoing process has several features. The award T is divided into split, sub-component award values that are configured to eliminate values that end in "4" and maximize the values that end in the culturally favorable digit number "8." Another feature is that the awards have a spread that does not dip to small values inasmuch as a minimum value M is used to provide limits on the split values.

In situations where a split value P is ≤4 the process may limit adjustment of the values to where P is >10 or adding ten to a split value <4 (and conversely reducing a split value <15 by ten) to avoid the split becoming a negative value. If no split value is greater than 15 then smaller adjustments could be made to recast those values to not have a least significant digit of "4." This makes the prize amounts more culturally aware. The prizes reflect luck to the players and avoid perceived "unlucky" numbers.

The aforementioned process may also be extended to more than the least significant digits. For example, of P1=148 and P2=320 by using the rules above "60" could be subtracted from P1 and "60 added to P2 resulting in P1=88 and P2=380.

As stated above any eligible award provided to the player may be configured into the culturally favorable splits as described above. The award may be delivered through a game or system based mystery award, game feature or secondary award or a promotional award.

Where the player is entitled to multiple awards, those awards may be configured according to the above by splitting each award or combining them and then splitting them into culturally favorable value amounts.

Community Game with Gift Feature:

The above described award configuration is well suited, but is not exclusive to, a community game feature as herein described. In the Chinese culture, as well as other Asian cultures, there is a custom of giving money to friend/relatives during holidays or special occasions, e.g. weddings, births. These gifts take the form of cash delivered in a red envelope. The color red is believed to ward off evil spirits and give both the donor and recipient good luck. Thus, Asian players associate a red envelope with good luck and good fortune.

According to an embodiment, a number of gaming devices are associated for community gaming. In a physical casino this association may be on a local, bank level such as, for example, eight similar gaming devices arranged in close physical proximity or may be across one or more casino venues on a wide area network. For Internet and Broadband based play, the gaming devices (e.g., PCs, tablets, laptop computers, Smart phones), may be associated as arranged by the host according to game-type, game credit denomination, player characteristic, or the like. In one embodiment, all of the games played on the community gaming devices are similarly configured either with the same game or a clone of the same game. Where the community is operated on a local area network such as at a bank of machines, a controller is provided in one of the associated devices to control the network, community game operations and the like. This controller may be included in the EGM Processor Board 203, iView 209 or in a separate board. Where the community game is operated from a system level the game may be hosted at the progressive server 849, game engines server 823 an existing selected server or a dedicated server.

Participation in the community features as hereinafter described, is based upon a player playing their respective gaming device to establish eligibility. Eligibility criteria may be based upon the player wagering an amount within a prescribed period of time, e.g. the player has wagered $5 over the past sixty seconds. Eligibility once established will persist but for only a limited period of time. If the player ceases playing, the amount wagered per unit time falls below the established criteria, and their gaming device is no longer eligible. Eligibility may be based upon alternate or additional factors such as player loyalty club tier level or the like.

The community features as hereinafter described may be triggered by various mechanisms. In an embodiment the features may be triggered by a player of a community game obtaining a triggering outcome on their gaming device, e.g. obtaining a certain combination of symbols (symbol-based trigger) or a certain outcome. Mystery triggers may be used as well such as described above. System based mystery triggers may be used as well. For purposes of this disclosure it shall be assumed that the trigger is a symbol-based trigger.

In a broad overview, each player plays their respective gaming device and obtains winning and losing outcomes. Winning outcomes entitle the player to an award according to the game ward criteria. When a feature trigger occurs, e.g. in this example when a player of a community game obtains a predetermined feature trigger symbol combination, a community gift exchange session is initiated. The sizes of the gifts depend upon the eligibility criteria and/or the triggering event.

Figure 8:
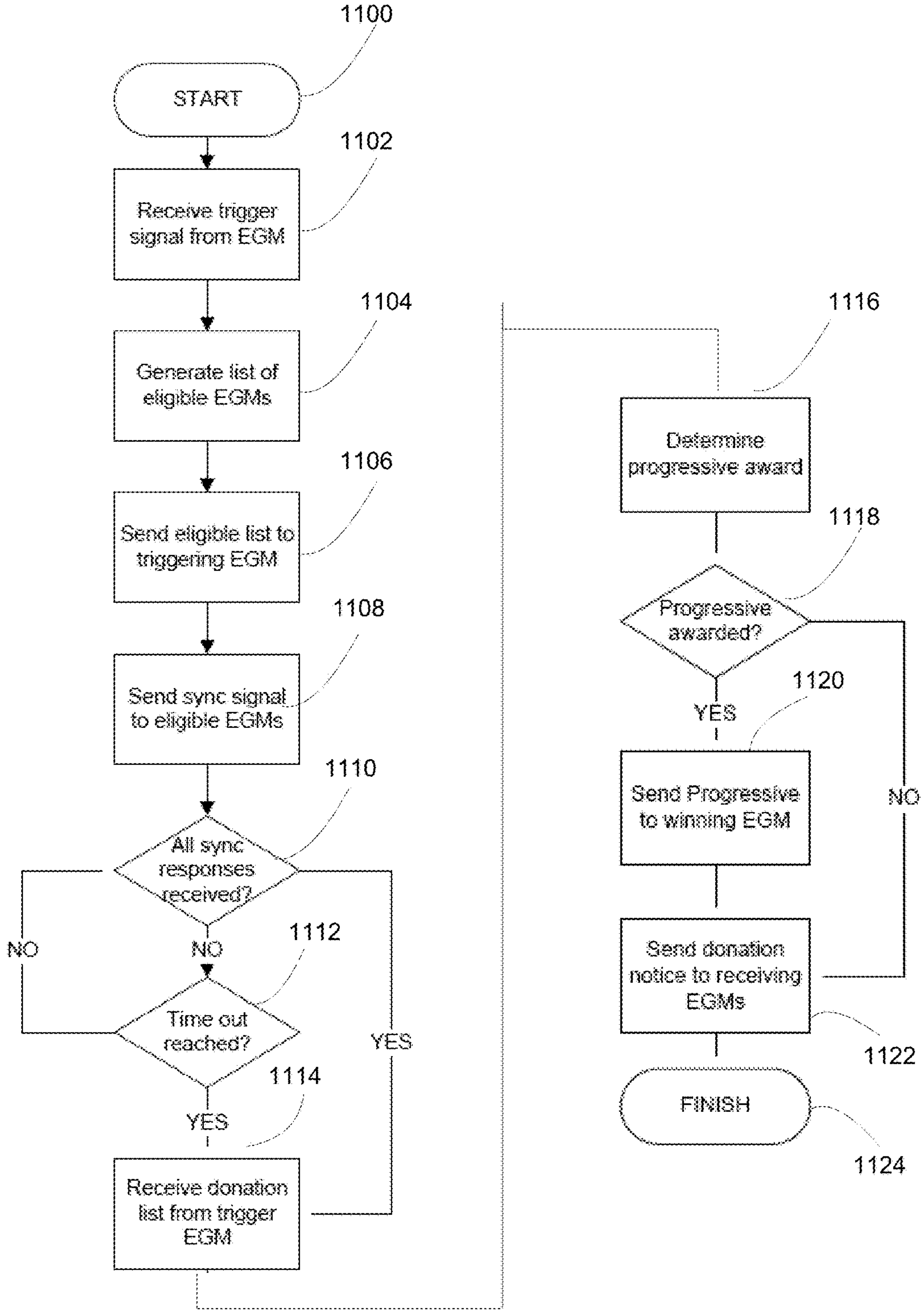
FIG. 8 is logic diagram for a local/system controller operation for the community game and progressive feature(s) of the disclosed embodiments.

Turning to FIGS. 8-12, the features and components of the disclosed embodiments are described below. With particular reference to FIG. 8, at 1100 the process is initiated and at 1102 the community game controller receives a trigger signal from a gaming device (EGM) that the triggering symbol outcome has been obtained. For example, where the game on the gaming device is a spinning reel video slot machine game, the triggering outcome may be a triggering player obtaining three Dragon symbols on their gaming device display. When a trigger condition occurs, the community game controller interrogates the community game network for those gaming devices on the community game network which have satisfied eligibility criteria.

At 1104 the controller generates a list of eligible gaming devices on the community game network and at 1106 sends a list of eligible gaming devices to the triggering gaming device. At 1108 the community game controller sends a synch signal to the eligible gaming devices 1004*a, b* which advises those players (or controls those gaming devices) that they have qualified for a community game award and to pause play and await their award. The eligible gaming devices 1004*a, b* report to the community game controller their identification numbers and network addresses. At 1110 the process determines whether all of the synch responses have been received by the community game controller. If not the process iterates until at 1112 a time out period has elapsed. After all synch responses have been received (or the response period has timed out at 1112), the player at the triggering gaming device receives at 1114 a donation list of the eligible gaming devices on the community network. In this regard, the triggering gaming device may display at its primary or secondary display 14, 18 or where, for example, the trigger is a system based trigger at the system interface display 30 (or as presented by an inset display at the primary display 14 as disclosed in Kelly et al, U.S. Pat. No. 8,241,123 titled "Video Switcher and Touch Router Method for a Gaming Machine" issued Aug. 14, 2012, a display such as display 1000 in FIG. 10.

Figure 10:
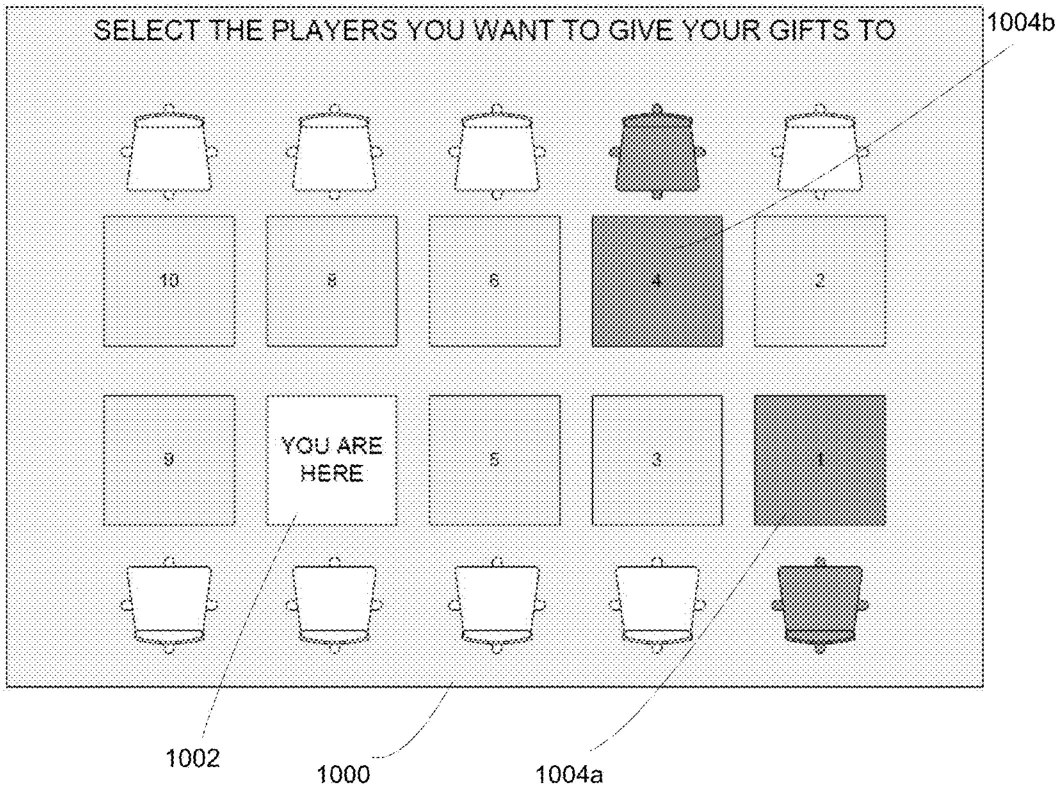
FIG. 10 illustrates an example of a display for the community game feature triggering player to select gift recipients.

This display 1000 may graphically indicate the gaming devices networked for the community game, their eligibility condition, location, as well as the triggering gaming device location. As shown in the example of FIG. 10, at 1002 is an indication of the location of the triggering gaming device and at 1004*a, b* the location of the other gaming devices which have satisfied eligibility requirements. The remaining gaming devices in the display have not met the eligibility criteria and may be "grayed" out or shown in phantom to indicate ineligibility. Other displays and lists may be used. For example, the display may display, associated with the triggering and eligible gaming devices, player avatars or photos, nicknames or the like.

In an embodiment the player of the gaming device triggering the community feature may select target recipient/donee gaming machines from the displayed eligible gaming machines for "gifting." In another embodiment the recipients are selected automatically and the triggering player is informed that he/she will be sending a gift to another gaming device. In still a further embodiment, the triggering player may select just one target recipient/donee. If no other gaming machines on the community network are eligible, a standalone award process is initiated.

Figure 11:
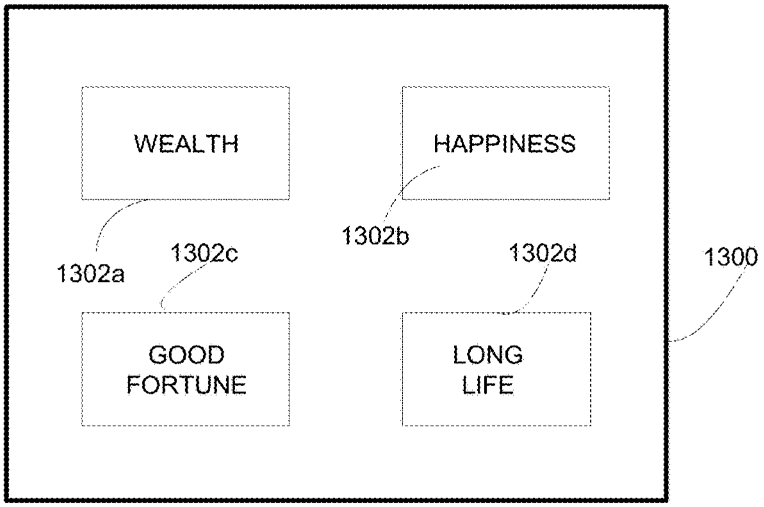
FIG. 11 illustrates and example for the community game triggering player to label gifts to recipients in culturally identifiable terms.

In an embodiment the triggering gaming machine player may choose a virtual envelope to send their gift(s) to the recipient(s). FIG. 11 shows a display through which the triggering gaming machine player may select a virtual envelope. Accordingly, the display 1300 may display virtual envelopes 1302*a-d* labeled "WEALTH," "HAPPINESS," "GOOD FORTUNE" and "LONG LIFE." In an embodiment the envelope selected is the same for each recipient; however, in another embodiment different envelopes may be selected for different target recipients.

In the community game feature described herein, none of the target recipients selected by the player of the "triggering" gaming device nor the selection of the virtual envelope has an effect on the awards to be issued to the recipients or the player of the triggering gaming device. It is a feature of one embodiment that, when the community feature is triggered, every eligible player receives at least one virtual envelope accompanying an award that is derived from the recipient's own eligibility criteria. For the player triggering the feature (or deemed to have triggered the feature), the award may be derived from one or both of the triggering player's eligibility criteria as well as the game pay table award schedule. For example, if the player of gaming machine EGM 1 triggers the community "gifting" feature, they may be entitled to an award of 1000 credits.

The award to EGM 1 may be a single award contained in a virtual envelope or may be comprised of multiple award envelopes each containing a value perhaps configured according to cultural criteria, e.g. five envelopes representing values of 778, 8, 68, 58 and 88 credits. These envelopes may appear to the player and the player may choose to believe that they are being given to him/her by other players. For example, when the feature is triggered, the triggering player may choose to give an envelope of WEALTH to the other players.

At the triggering player's gaming device there may be displayed five HAPPINESS envelopes and the players of the other gaming devices have displayed at least one WEALTH envelope as designated by the triggering player. The triggering player touches his displayed envelopes to reveal at least the pay table award of 1000 credits (broken down into five favorable values as stated above as well as one or more other envelopes containing a total value dictated by the triggering player's eligibility criteria, e.g. a LONG LIFE revealing a prize of 288 credits. The other, non-triggering players, receive at least one envelope (either as indicated by the triggering player or the controller) which reveal an aggregate award determined by their own eligibility criteria. If an eligible player is not selected to receive an envelope, the controller may package the player's award in a randomly selected envelope or in a special envelope perhaps presented by an animated "Dragon" avatar. The table below provides an example where the player of gaming device EGM1 has obtained the trigger condition and is awarded a pay table based award as well as an eligibility criteria based award represented by the envelopes. Players of the gaming devices EGM 2 and EGM 3 are awarded amounts based upon their individual eligibility criteria.

| | Award Type | | |
|---|---|---|---|
| | EGM 1 (triggering EGM) | EGM 2 | EGM 3 |
| Trigger | 1000 | — | — |
| Eligibility Criteria | 288 | 880 | 380 |
| Total | 1288 | 880 | 380 |

Figure 12:
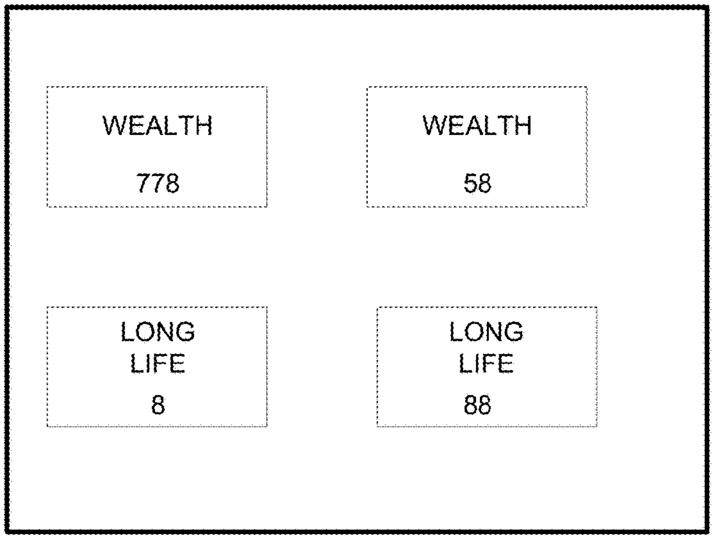
FIG. 12 shows an example of a recipient's display indicating receipt of gifts from one or more players during the community game.

Thus the fact that the player of the triggering gaming device selects recipients of gifts, the triggering player is not giving away any of his/her award but is merely packaging the other players' awards in a virtual envelope selected by the triggering player. The triggering event initiates the awards supported by the impression that players are receiving awards from other players. This promotes camaraderie and excitement among the players. The awards may be configured and split into culturally favorable number digits in the manner described above. For example, where a player is to receive an award of 932 credits, the award may be configured as four envelopes as shown in FIG. 12.

The funding for the community feature awards is typically built into the pay schedule of the gaming devices and controller. The feature awards may also be funding as a percentage of the wagers from the gaming devices on the community gaming network whereupon the values of the awards may increase between triggering events.

The foregoing improvements could be applied to P2P gaming as well as entertainment only gaming, physical brick and mortar gaming venues like casinos, and play of gaming devices occurring over the Internet or Broadband communication networks.

Figure 9:
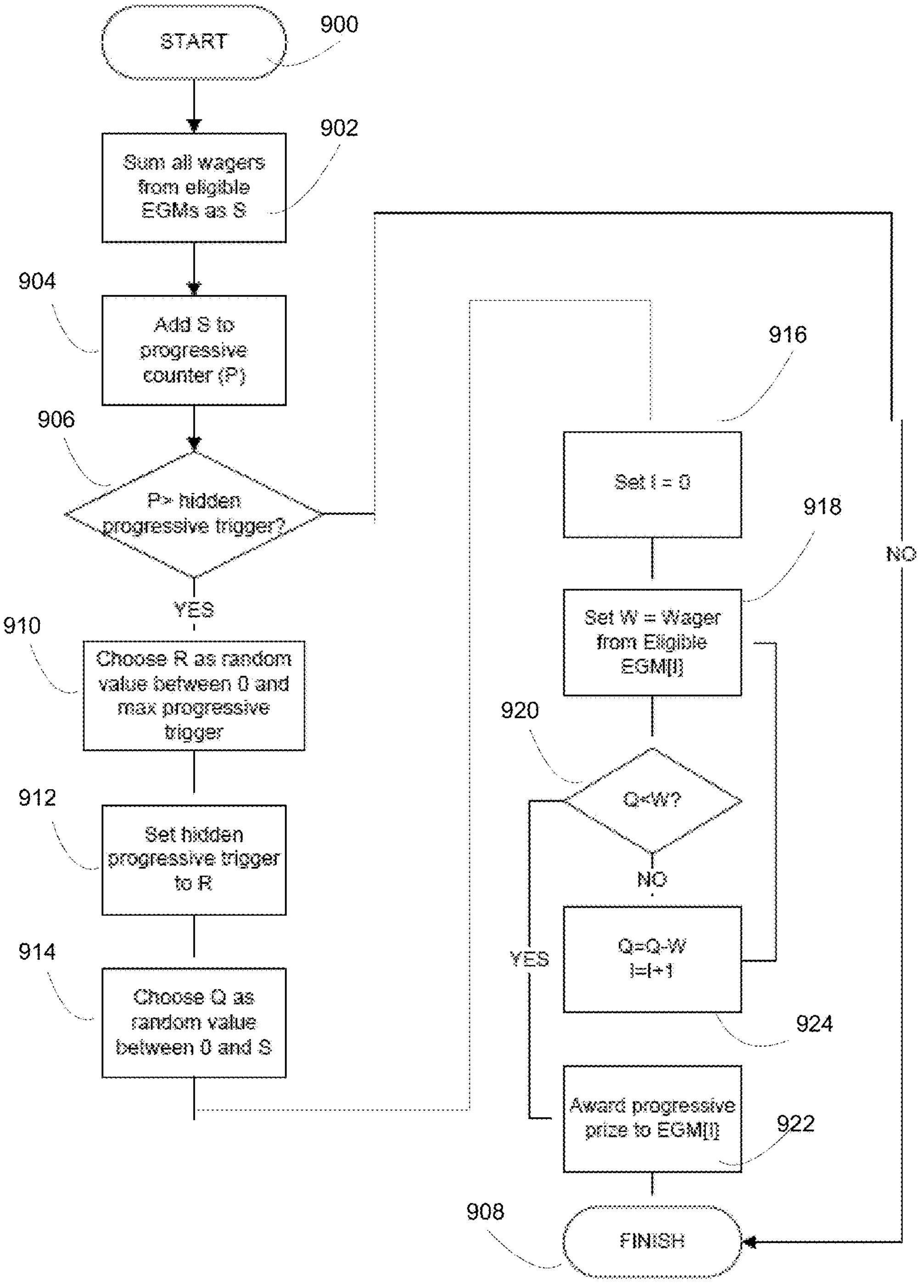
FIG. 9 is a logic diagram showing the system and method for awarding a progressive prize in one or more embodiments of the community game of the disclosed embodiments.

Progressive Feature:

Turning to FIGS. 8 and 9, in an embodiment the community game may also include a progressive prize award A. The funding for the award A may be from one or more of percentages of the wagers on the community game network or from marketing or promotional money from the host and/or third parties. The funding for the progressive can be by any known means. The amount A of the progressive is displayed to the players to increase excitement in the game. The progressive award A may have a maximum amount $A_{Max}$ by which it must be awarded. To provide the progressive one or more of a LAN controller or a systems based controller such as the progressive server 849 (FIG. 4B) may be configured according to the following.

The determination of whether to award the progressive or not may be made during the community award gift feature. In an embodiment after the community award gift feature is triggered as described above and after step 1114 at 1116 (FIG. 8), the controller determines the current and available progressive award amount A. At step 1118 a determination is made as to whether to trigger the award of all or a portion of the progressive amount A.

With reference to FIG. 9, the logic for the algorithm for the determination of a progressive trigger event is shown. At 900 the controller is enabled. In an embodiment the controller at 902, over the community network, receives data relating to the amounts wagered by the players at their respective and eligible gaming device and those amounts are routinely summed into a variable S. Eligibility of the gaming devices may be as determined above, e.g. based upon wager history per a predetermined unit of time and/or player club tier level, last wager amount within a predetermined period of time or the like. At 904 S is added to a progressive counter P. This summing may take place at regular intervals such as when the polling of the gaming devices in the community network.

After each progressive award is issued, a progressive counter trigger value $P_{Trigger}$ is randomly selected between '0' and a maximum trigger value $P_{Max}$. $P_{Max}$ is selected by the operator and determines the frequency of the progressive being awarded and is taken into consideration in determining a desired $A_{Max}$. At each summing interval the value of the aggregated values of P (current P+S) are compared to $P_{Trigger}$ at 906. If $P \le P_{Trigger}$, the progressive award is not triggered and the summing into P continues and at 908 the iteration is finished and the progressive award A is not issued.

With reference to FIG. 8, the packaged gift awards are then sent to the receiving gaming devices at 1122 and the community gift feature is finished at 1124. However when (1) the community feature is triggered at 1102 and (2) when at 906 when $P > P_{Trigger}$ the progressive award event is triggered. Triggering may occur at any time; however the award sequence of the award is held in abeyance until a community feature trigger event, e.g. until a player in the community has obtained the triggering symbol combination. Once the progressive trigger event occurs at 910 a random value is selected between 0 and a maximum trigger value $P_{Max}$ and that value at 912 is set to the new $P_{Trigger}$ for the next progressive determination cycle.

When during the community feature a progressive award is triggered, the controller is also configured to select which of the eligible gaming device participating in the community feature is entitled to the award. Unlike the community "gift" feature" determined by the player's play criteria at their gaming device(s), the progressive award, in an embodiment, is not dependent upon individual play criteria. In other words, if a player is wagering a minimum to establish eligibility and the progressive award is triggered, the player may receive the same amount as a player wagering a maximum amount. However, as described herein, a player wagering a maximum amount has a greater opportunity of being selected for the progressive award thus providing an incentive to wager a maximum amount. At 914 the controller chooses a random value Q between 0 and the value of the last $S_{Last}$ (the sum of the last wagers for the eligible gaming devices resulting in $P > P_{Trigger}$). For example, for a bank of community games the value of $S_{Last}$ which pushes $P > P_{Trigger}$ resulting in the progressive trigger may be 1150 credits (i.e. $S_{Last}=1150$) and Q may randomly be selected to be 825.

At 916 the iterative loop is set at "0" and at the initial iteration a first eligible gaming device (e.g., EGM 1) in the community is selected to be tested to determine if that particular gaming device will be entitled to the progressive award. At 918 the eligible wager $W_{EGM1}$ of EGM 1 which contributed to the value $S_{Last}$ is recalled and at 918 is compared to Q. If at 920 $Q < W_{EGM1}$ then the progressive is awarded to EGM 1 at 922. In an example where $W_{EGM1}$ is 150 credits, the equation is not satisfied and accordingly EGM1 is not entitled to the progressive award for this iteration. At 924 $W_{EGM1}$ is subtracted from Q ($Q_{New}=Q-W_{EGM1}$) ($Q_{New}$ now equals 1150−150=1000) and the next iteration (I=I+1) is made by selecting a next eligible EGM2 in the community. For the next EGM2 is wager contribution to $S_{Last}$, $W_{EGM2}$ is tested at 920 and if $Q_{New} < W_{EGM2}$ then EGM 2 is entitled to the award. If not, then $W_{EGM2}$ is subtracted from $Q_{New}$ to redefine $Q_{New}$ and the next EGM3 is tested. This process iterates reducing $Q_{New}$ until $Q_{New} < W$ at which time the gaming device satisfying that condition is entitled to the award. In this fashion the selection process provides a bias toward those gaming devices wagering greater amounts.

Returning to FIG. 8, if at 1118 it is determined to award the progressive and the winning gaming device is selected as described above, the progressive award is sent to the selected gaming device at 1120. The award sequence may include causing the selected gaming device to display envelopes including gold coins or the like as well as award the value to the player such as by adding the value to the player's gaming device credit meter, electronic account or, where required, issuing a hand pay. The award of the progressive award may be combined with the community feature "gifting" award at 1122 for a composite display and award or the awards may be sequential. In an embodiment, the progressive award may be broken into culturally favorable award amounts as described above.

The foregoing description, for purposes of explanation, uses specific nomenclature and formula to provide a thorough understanding of the disclosed embodiments. It should be apparent to those of skill in the art that the specific details are not required in order to practice the disclosed embodiments. The embodiments have been chosen and described to best explain the principles of the invention and its practical application, thereby enabling others of skill in the art to utilize the disclosed embodiments, with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A chance-based gaming system for providing one or more culturally configured awards to players, the system comprising:

a plurality of chance-based gaming devices connected to a network to provide one or more culturally configured awards to players, each of the plurality of chance-based gaming devices including:

a gaming device processor;

a gaming device memory storing a game program;

a plurality of input devices including:

(a) an acceptor of a first physical item associated with monetary funds;

(b) a button actuatable to cause an initiation of a payout associated with a credit balance; and a monetary payout device that cashes the payout from the chance-based gaming device; and one or more chance-based gaming servers connected to the network for communication with the plurality of chance-based gaming devices, each of the one or more chance-based gaming servers including a server processor, one of the chance-based gaming servers and the chance-based gaming devices configured to determine an award event, using a processor, wherein the processor is a gaming device processor or a server processor, of one or more of the culturally configured awards that issues to one or more players having a value A;

wherein at least one of the one or more chance-based gaming servers connected to the network for communication with the plurality of chance-based gaming devices includes a list of culturally favorable number sets and/or culturally unfavorable number sets;

wherein one or more of the chance-based gaming servers and the chance-based gaming devices is configured to determine, using a processor, wherein the processor is a gaming device processor or a server processor, if a single award is to be issued, and (i) if value A is an amount expressed as a culturally favorable number set to provide for issuance of value A as the award, (ii) if value A is expressed in a culturally unfavorable number set to divide value A into at least two sub-component awards, and (iii) adjust the component awards to avoid the culturally unfavorable number sets for issuance of the awards; and wherein one or more of the chance-based gaming servers and the chance-based gaming devices configured to determine, using the processor, wherein the processor is the gaming device processor or the server processor, if multiple awards are to be issued, and (i) divide value A into at least two component awards, and (ii) adjust an amount of each component award to amounts expressed as culturally favorable number sets for issuance of the awards, wherein the monetary payout device issues the awards that are expressed as culturally favorable number sets.

2. The system of claim 1, wherein the culturally favorable number sets include number sets ending in numbers selected from the group consisting of one or more of 7 and 8 digits.

3. The system of claim 1, wherein the culturally unfavorable numbers sets include number sets ending in numbers selected from the group consisting of one or more of 4 and 13.

4. The system of claim 1, wherein the chance-based gaming devices configured to render game winning and losing outcomes and at least one outcome determines an award event.

5. The system of claim 4, wherein the chance-based gaming devices have an associated video display, and wherein one of the chance-based gaming servers and chance-based gaming device obtains an award event outcome to (i) present on the video display a graphic indicating a location of target chance-based gaming devices, and (ii) enable the player of the chance-based gaming device to obtain the award event outcome to define two or more of the component awards having culturally favorable number sets.

6. The system of claim 5, wherein one or more of the chance-based gaming servers is configured to define chance-based gaming device performance data for eligibility, to receive the performance data through the network from the chance-based gaming devices, and to define the target chance-based gaming devices as those chance-based gaming devices having performance data corresponding to the eligibility performance data.

7. A method for providing a plurality culturally configured awards to players of chance-based gaming devices connected to a network for communication with a chance-based gaming server, the method comprising:

storing, on at least one of the chance-based gaming server and the chance-based gaming devices, a list of culturally favorable number sets and/or culturally unfavorable number sets;

configuring one of the chance-based gaming server and the chance-based gaming devices to determine an award event that provides for issuance to one or more players of one or more of the culturally configured awards having a value A, each chance-based gaming device having and a plurality of input devices including: a gaming device processor, a gaming device memory storing a game program, a plurality of input devices including (a) an acceptor of a first physical item associated with monetary funds and (b) a button actuatable to cause an initiation of a payout associated with a credit balance, and a monetary payout device that cashes the payout from the chance-based gaming device;

enabling one of the chance-based gaming server and chance-based gaming devices to divide value A into a plurality of award sub-components;

enabling one of the chance-based gaming server and chance-based gaming devices to adjust the plurality of award sub-components to amounts expressed as culturally favorable number sets before issuing the culturally configured awards; and issuing, via the monetary payout device, the culturally configured awards that are expressed as culturally favorable number sets.

8. The method of claim 7, further comprising configuring at least one of the chance-based gaming server and the chance-based gaming devices to determine an award event as a progressive prize award event.

* * * * *